(12) United States Patent
Aoyama et al.

(10) Patent No.: US 7,973,101 B2
(45) Date of Patent: *Jul. 5, 2011

(54) BIODEGRADABLE RESIN COMPOSITION AND MOLDED ARTICLE PRODUCED FROM THE SAME

(75) Inventors: Taizo Aoyama, Settsu (JP); Nobuo Nakamura, Settsu (JP); Yoshihiko Hashimoto, Settsu (JP); Noriyuki Suzuki, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/914,298

(22) PCT Filed: May 12, 2006

(86) PCT No.: PCT/JP2006/309535
§ 371 (c)(1),
(2), (4) Date: Nov. 13, 2008

(87) PCT Pub. No.: WO2006/121147
PCT Pub. Date: Nov. 16, 2006

(65) Prior Publication Data
US 2009/0076191 A1     Mar. 19, 2009

(30) Foreign Application Priority Data

May 13, 2005   (JP) .................. 2005-141963
May 24, 2005   (JP) .................. 2005-151334

(51) Int. Cl.
*C08K 5/21*     (2006.01)
*C08K 5/16*     (2006.01)
(52) U.S. Cl. ..................... 524/211; 524/186
(58) Field of Classification Search .............. 523/124; 524/186, 211
See application file for complete search history.

(56) References Cited

U.S. PATENT DOCUMENTS

| | | | | |
|---|---|---|---|---|
| 5,859,119 A | * | 1/1999 | Hoefflin | 524/494 |
| 5,981,257 A | * | 11/1999 | Fukui et al. | 435/232 |
| 6,645,622 B2 | * | 11/2003 | Yamane | 428/364 |

FOREIGN PATENT DOCUMENTS

| | | | |
|---|---|---|---|
| JP | 6-41376 A | | 2/1994 |
| JP | 10-101919 A | | 4/1998 |
| JP | 10-158369 A | | 6/1998 |
| JP | 11-5849 A | | 1/1999 |
| JP | 2002-155207 A | | 5/2002 |
| JP | 2004-051659 | * | 2/2004 |
| JP | 2004-161802 | * | 6/2004 |
| JP | 2004-269720 A | | 9/2004 |
| JP | 2004-285258 A | | 10/2004 |
| JP | 2005-23165 A | | 1/2005 |
| JP | 2005-232230 A | | 9/2005 |
| JP | 2006-45487 A | | 2/2006 |
| JP | 2006-137853 A | | 6/2006 |
| WO | 2005/085352 A1 | | 9/2005 |

OTHER PUBLICATIONS

Machine translation of JP 2004-051659.*
Machine translation of JP 06-299077.*
Machine translation of JP 11-005849.*
Machine translation of JP 2004-161802. Jun. 2004.*

* cited by examiner

*Primary Examiner* — Milton I Cano
*Assistant Examiner* — John Uselding
(74) *Attorney, Agent, or Firm* — Sughrue Mion, PLLC

(57) ABSTRACT

Disclosed is a resin composition excellent in impact resistance, tensile properties and processability such as draw down property, which is produced by using a plant-derived biodegradable polymer produced by actively fixing carbon dioxide present in the earth. A resin composition comprising (A) a specific biodegradable (3-hydroxyalkanoate) copolymer, (B) a graft copolymer and (C) an acrylic processing modifier, the graft copolymer (B) and the acrylic processing modifier (C) being contained in the composition in amounts of 0.1 to 100 parts by weight and 0.1 to 30 parts by weight, respectively, based on 100 parts by weight of the biodegradable (3-hydroxyalkanoate) copolymer (A).

7 Claims, No Drawings

BIODEGRADABLE RESIN COMPOSITION AND MOLDED ARTICLE PRODUCED FROM THE SAME

TECHNICAL FIELD

The present invention relates to a composition comprising a biodegradable polymer of plant origin which is obtained by positively fixing carbon dioxide around the earth and is expected for prevention of global warming, and to a molded article of the same.

BACKGROUND ART

Conventionally, plastics have properties such as processability and usability, whereas, they have been thrown away after use owing to their difficulty in recycling, and to hygienic point of view. However, as the use and disposal of the plastics increase, problems associated with their disposal by landfilling or incineration have drawn attention, and they may be responsible for great burden on the global environment such as deficiency of garbage landfill site, influences on ecological system by remaining nondegradable plastics in the environment, generation of detrimental gas in combustion, global warming resulting from a large amount of combustion calorie, and the like. In recent years, biodegradable plastics have been extensively developed as a material which can solve the problems of the plastic waste.

Additionally, these biodegradable plastics are of plant origin, and absorb and fix carbon dioxide in the air. Carbon dioxide generated in combustion of these biodegradable plastics of plant origin was originally present in the air, therefore increase in carbon dioxide in the atmosphere is not caused. This phenomenon is referred to as "carbon neutrality", which tends to be placed importance thereon. Carbon dioxide fixation is expected to be effective in preventing the global warming. Particularly, in connection with Kyoto Protocol in which achievement level of carbon dioxide reduction was suggested, deliberation of Congress for ratification was approved in Russia in August 2003. Therefore, it is highly probable that the Protocol will come into effect actually, whereby materials for carbon dioxide fixation have drawn a great deal of attention, and active use thereof has been desired.

Meanwhile, although aromatic polyesters have been produced and consumed in large quantities as general-purpose polymers, in light of fixation of carbon dioxide and prevention of global warming, they are not preferable material in terms of the carbon neutrality, because they are produced from fossil fuels, thereby leading to release of carbon dioxide fixed in the ground into the atmosphere. For example, Patent Document 1 describes that addition of a highly dispersible high-molecular weight vinyl aromatic copolymer to an aromatic polyester enables enhancement of the melt strength. However, as described above, this polyester resin composition is not a preferable material in light of the carbon neutrality.

Accordingly, in light of the carbon neutrality, biodegradable aliphatic polyester-based resins have been drawing attention, and particularly polylactic acid-based resins, poly (3-hydroxyalkanoate), more particularly poly[(3-hydroxybutyrate)-co-(3-hydroxyhexanoate)] and the like have been drawing attention as the plastics of plant origin.

However, these resins are problematic in terms of physical properties and molding processability in use without modification. For example, Patent Document 2 describes a thermoplastic resin composition comprising a graft copolymer prepared using a polylactic acid-based resin, and a polyorganosiloxane/acrylic composite rubber containing polyorganosiloxane and an alkyl (meth)acrylate rubber. However, polylactic acid resins are described principally, and poly(3-hydroxyalkanoate) is not referred to. In addition, the resin composition is not sufficient with respect to physical properties, particularly impact resistance and transparency.

Moreover, Patent Document 3 describes that molding processability in vacuum molding, air-pressure molding and the like can be improved by compounding an acryl compound to polyester that is a thermoplastic polymer. However, a poly(3-hydroxyalkanoate) copolymer that is a biodegradable aliphatic polyester-based resin is not referred to as the polyester.
Patent Document 1: Japanese Unexamined Patent Application Publication No. Hei 6-41376;
Patent Document 2: Japanese Unexamined Patent Application Publication No. 2004-285258;
Patent Document 3: Japanese Unexamined Patent Application Publication No. 2002-155207;

DISCLOSURE OF THE INVENTION

Problems to be Solved by the Invention

An object of the present invention is to provide a resin composition that is excellent in impact resistance, tensile properties, processability such as draw down property and the like using a biodegradable polymer of plant origin obtained by actively fixing carbon dioxide around the earth. Further object is to provide a resin composition that is also excellent in modulus of elasticity in flexure, and heat resistance.

Means for Solving the Problems

The present inventors elaborately investigated in order to solve the aforementioned problems, and consequently found that a resin composition that is excellent in impact resistance, tensile properties, transparency, processability such as draw down property and the like is obtained by mixing a certain graft copolymer, and an acrylic processing modifier with a biodegradable poly(3-hydroxyalkanoate) obtained by actively fixing carbon dioxide around the earth. Moreover, it was found that a resin composition and a molded article that are excellent also in flexural modulus of elasticity, and heat resistance are obtained by further compounding a filler or the like, whereby the present invention was accomplished.

Accordingly, the present invention relates to a resin composition comprising
(A) a biodegradable (3-hydroxyalkanoate) copolymer,
(B) a graft copolymer, and
(C) an acrylic processing modifier (C),
wherein the biodegradable (3-hydroxyalkanoate) copolymer (A) has a recurring unit represented by the formula (1): [—CHR—CH$_2$—CO—O—] (wherein R represents an alkyl group represented by C$_n$H$_{2n+1}$; and n is an integer of 1 to 15);
the graft copolymer (B) is obtained by graft polymerization of a vinyl monomer onto at least one rubber selected from the group consisting of (b1) a composite rubber comprising a polyorganosiloxane component and a polyalkyl (meth)acrylate component, (b2) an acrylic rubber, and (b3) a diene rubber constituted with a diene monomer;
the acrylic processing modifier (C) has a weight average molecular weight (Mw) of 500,000 to 10,000,000; and
the resin composition comprises 0.1 to 100 parts by weight of the graft copolymer (B), and 0.1 to 30 parts by weight of the acrylic processing modifier (C) based on 100 parts by weight of the biodegradable (3-hydroxyalkanoate) copolymer (A).

In an aspect of the invention, the aforementioned biodegradable (3-hydroxyalkanoate) copolymer (A) is preferably poly[(3-hydroxybutyrate)-co-(3-hydroxyhexanoate)] having a (3-hydroxybutyrate) recurring unit and a (3-hydroxyhexanoate) recurring unit.

Furthermore, the biodegradable (3-hydroxyalkanoate) copolymer (A) preferably has a molecular weight of 300,000 to 3,000,000 in terms of the weight average molecular weight.

In addition, the constituent ratio of the recurring units in the poly[(3-hydroxybutyrate)-co-(3-hydroxyhexanoate)] is preferably represented by (3-hydroxybutyrate) unit/(3-hydroxyhexanoate) unit=99/1 to 80/20 (mol/mol).

Moreover, it is preferred that the vinyl monomer in the graft copolymer (B) comprises 70 to 100% by weight of at least one vinyl monomer selected from the group consisting of a vinyl cyanide monomer, an aromatic vinyl monomer, an acrylic ester and methacrylic ester, and 30 to 0% by weight of other vinyl monomer that is copolymerizable therewith.

Further, it is preferred that the graft copolymer (B) is obtained by graft polymerization of the vinyl monomer onto the acrylic rubber (b2), and that the difference in refractive indices between the graft copolymer (B) and the poly(3-hydroxyalkanoate) (A), and the difference in refractive indices between the acrylic processing modifier (C) and the poly(3-hydroxyalkanoate) (A) are equal to or less than 0.02, respectively.

Still further, it is preferred that a monomer that constitutes the acrylic rubber (b2) predominantly comprises an acrylic ester, and the vinyl monomer predominantly comprises a methacrylic alkyl ester.

Moreover, it is preferred that the diene rubber (b3) is obtained by copolymerization of 50 to 100% by weight of the diene monomer, 50 to 0% by weight of other vinyl monomer that is copolymerizable with the diene monomer, and 0 to 5% by weight of a polyfunctional monomer having two or more nonconjugated double bonds within one molecule (wherein total of the diene monomer, the vinyl monomer and the polyfunctional monomer accounting for 100% by weight), and that the weight ratio of the diene rubber (b3) and the vinyl monomer is diene rubber (b3)/vinyl monomer=15/85 to 90/10 (wt/wt).

In addition, it is preferred that the acrylic processing modifier (C) should be a (co)polymer predominantly constituted with at least one monomer selected from the group consisting of an acrylic ester and a methacrylic ester.

Further, it is preferred that the acrylic processing modifier (C) predominantly comprises a copolymer of butyl acrylate and methyl methacrylate, or a copolymer of butyl methacrylate and methyl methacrylate.

It is preferred that the resin composition further contains 0.1 to 10 parts by weight of at least one selected from a higher fatty acid amide, an urea derivative and a sorbitol compound as a nucleating agent based on 100 parts by weight of total amount of the (A), (B) and (C).

Moreover, it is preferred that the resin composition further comprises 0.1 to 100 parts by weight of a filler based on 100 parts by weight of total amount of the (A), (B) and (C).

Hereinafter, the present invention will be explained in detail.

As the biodegradable polymer in the present invention, the biodegradable poly(3-hydroxyalkanoate) copolymer (A) having a recurring unit represented by: [—CHR—CH$_2$—CO—O—] (wherein R represents an alkyl group represented by C$_n$H$_{2n+1}$; and n is an integer of 1 to 15) may be used because of excellent degradability under anaerobic conditions and moisture resistance, and possibility of increase in the molecular weight.

Typical examples of the biodegradable poly(3-hydroxyalkanoate) copolymer (A) in the present invention include e.g., poly[(3-hydroxybutyrate)-co-(3-hydroxyvaleate)], poly[(3-hydroxybutyrate)-co-(3-hydroxyhexanoate)], poly[(3-hydroxybutyrate)-co-(3-hydroxyoctanoate)], poly[(3-hydroxybutyrate)-co-(3-hydroxydecanoate)], and the like. Among these, poly[(3-hydroxybutyrate)-co-(3-hydroxyhexanoate)] is preferred, and the copolymer produced by a microorganism is more preferred. Further, in addition to polyglycolic acid, polylactic acid, poly 3-hydroxybutyric acid, poly 4-hydroxybutyric acid, poly 4-hydroxyvaleric acid, poly 3-hydroxyhexanoic acid or polycaprolactone, one, or a combination of two or more kinds among aliphatic polyesters such as polyethylene adipate, polyethylene succinate, polybutylene adipate or polybutylene succinate, or a copolymer prepared with a mixture of the monomers constituting these polymers can be added if necessary, as a polymer constituted with an aliphatic polycarboxylic acid and an aliphatic polyhydric alcohol as main constituents.

Herein, the poly[(3-hydroxybutyrate)-co-(3-hydroxyhexanoate)] is used as a generic name of copolymers comprising 3-hydroxybutyrate and 3-hydroxyhexanoate as a principal component. The copolymer may also include the other monomer component as described above as long as 3-hydroxybutyrate and 3-hydroxyhexanoate are included as a principal component. Further, the polymerization process for obtaining the aforementioned copolymer is not particularly limited, and any copolymerization process such as random copolymerization, alternating copolymerization, block copolymerization or the like may be applied.

The constituent ratio of the recurring units in poly[(3-hydroxybutyrate)-co-(3-hydroxyhexanoate)] in the present invention is preferably 99/1 to 80/20 (mol/mol), more preferably 97/3 to 82/18 (mol/mol), and still more preferably 95/5 to 85/15 (mol/mol) in terms of (3-hydroxybutyrate) unit/(3-hydroxyhexanoate) unit. The molar fraction (mol %) of (3-hydroxyhexanoate) in poly[(3-hydroxybutyrate)-co-(3-hydroxyhexanoate)] may be abbreviated as HH rate.

The biodegradable (3-hydroxyalkanoate) copolymer (A) of the present invention has a weight average molecular weight of preferably 300,000 to 3,000,000, more preferably 400,000 to 2,500,000, and still more preferably 500,000 to 2,000,000 in light of the impact resistance and tensile properties. When the weight average molecular weight of the (3-hydroxyalkanoate) copolymer (A) is less than 300,000, mechanical physical property may be inferior, while when the weight average molecular weight exceeds 3,000,000, the processing may be difficult.

The method of measuring the weight average molecular weight of the biodegradable (3-hydroxyalkanoate) copolymer (A) is not particularly limited, but by way of example, the molecular weight of the biodegradable (3-hydroxyalkanoate) copolymer (A) can be determined as a molecular weight in terms of the polystyrene equivalent measured with a GPC system manufactured by Waters Corporation equipped with a column Shodex K-804 (polystyrene gel) manufactured by Showa Denko K. K., using chloroform as a mobile phase.

Next, the graft copolymer of the component (B) will be explained.

The graft copolymer (B) of the present invention is obtained by graft polymerization of a vinyl monomer onto at least one rubber selected from the group consisting of (b1) a composite rubber comprising a polyorganosiloxane component and a polyalkyl (meth)acrylate component, (b2) an acrylic rubber, and (b3) a diene rubber constituted with a diene monomer. In the present invention, the impact resistance/processability balance can be improved without deteriorating physical and/or chemical properties of the biodegradable (3-hydroxyalkanoate) copolymer (A) by compounding the graft copolymer (B).

First, a composite rubber graft copolymer (hereinafter, may be also referred to as "graft copolymer (B1)") obtained by graft polymerization of the vinyl monomer onto the composite rubber (b1) comprising a polyorganosiloxane component and a polyalkyl (meth)acrylate component will be explained.

The polyorganosiloxane component that constitutes the composite rubber (b1) is a component constituting a main skeleton of the silicone rubber chain, and either straight or cyclic one can be used. Among these, in light of applicability to emulsion polymerization systems, and economical efficiency, cyclic organosiloxane is preferred. Specific examples of the cyclic organosiloxane include e.g., 6- to 12-membered hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like. These may be used alone, or two or more thereof may be used in combination.

The polyorganosiloxane component can be also obtained by copolymerization of a crosslinking agent, a graftlinking agent and any other organosilane which may be used as needed together with the aforementioned organosiloxane.

The aforementioned crosslinking agent is a component for introducing a cross-linked structure into the silicone rubber by copolymerization with the organosiloxane, thereby allowing the rubber elasticity to be developed. Specific examples of the crosslinking agent include e.g., tetrafunctional or trifunctional silane compounds such as tetramethoxysilane, tetraethoxysilane, triethoxymethylsilane, triethoxyethylsilane, butyltrimethoxysilane, propyltrimethoxysilane, octyltrimethoxysilane, and the like. These may be used alone, or two or more thereof may be used in combination.

The graftlinking agent described above may be a reactive silane compound having a polymerizable unsaturated bond or a mercapto group within the molecule, an organosiloxane having a polymerizable unsaturated bond or a mercapto group within the molecule, and the like, and is a component for introducing the polymerizable unsaturated bond or the mercapto group to the side chain and (or) to the end of the copolymer by copolymerizing with the aforementioned organosiloxane, the aforementioned crosslinking agent or the like. The polymerizable unsaturated bond or the mercapto group will serve as a graft active spot of the vinyl monomer for effecting the graft copolymerization, which may be used in the present invention. In addition, the polymerizable unsaturated bond or the mercapto group also serves as a crosslinking point when a radical reaction is allowed using a radical polymerization initiator. Also in the case of effecting the crosslinking by the radical reaction, the grafting is enabled since a part thereof would remain as the graft active spot.

Specific examples of the reactive silane compound having a polymerizable unsaturated bond within the molecule include e.g., β-methacryloyloxyethyldimethoxymethylsilane, γ-methacryloyloxypropyldimethoxymethylsilane, γ-methacryloyloxypropyltrimethoxysilane, γ-methacryloyloxypropyidimethylmethoxysilane, γ-methacryloyloxypropyltriethoxysilane, γ-methacryloyloxypropyldiethoxymethylsilane, γ-methacryloyloxypropyltripropoxysilane, γ-methacryloyloxypropyidipropoxymethylsilane, p-vinylphenyldimethoxymethylsilane, p-vinylphenyltrimethoxysilane, p-vinylphenyltriethoxysilane, p-vinylphenyldiethoxymethylsilane, vinylmethyidimethoxysilane, vinylmethyidiethoxysilane, vinyltrimethoxysilane, vinyltriethoxysilane, allylmethyldimethoxysilane, allylmethyldiethoxysilane, allyltrimethoxysilane, allyltriethoxysilane, and the like.

Examples of the reactive silane compound having a mercapto group within the molecule include e.g., mercaptopropyltrimethoxysilane, mercaptopropyldimethoxymethylsilane, and the like.

The proportion of these organosiloxane, crosslinking agent, graftlinking agent and other organosilane used in the polyorganosiloxane component is usually: 70 to 99.9% by weight, and preferably 85 to 99.5% by weight of the organosiloxane; 0 to 10% by weight, and preferably 0 to 5% by weight of the crosslinking agent; 0 to 10% by weight, and preferably 0.3 to 5% by weight of the graftlinking agent; 0 to 10% by weight, and preferably 0 to 5% by weight of the other organosilane, and it is preferred to use these agents such that total amount accounts for 100% by weight. The crosslinking agent and the graftlinking agent should not account for 0% concomitantly, and either one is preferably used in an amount of 0.1% by weight or more. When the proportion of the organosiloxane unit is lower than 70% by weight, properties as a rubber may be deficient, and the effect of developing the impact resistance is apt to be reduced. Whereas, the proportion higher than 99.9% by weight may lead to use of too small amount of the crosslinking agent, the graftlinking agent and the other organosilane, whereby the effect achieved by use of these agents is apt to be hardly achieved. When the proportion of the unit of the crosslinking agent or the graftlinking agent is too small, the effect of developing the impact resistance is apt to be reduced, while when the proportion is too great, properties as a rubber may be deficient, whereby the effect of developing the impact resistance is likely to be reduced.

The organosiloxane is preferably in the state of rubber latex, and can be produced by a method of polymerizing a mixture comprising the graftlinking agent and the crosslinking agent used if necessary, and further organosilane other than these agents in the presence of an emulsifying agent by mechanical shearing to permit emulsification dispersion in water thereby giving an acidic state. The mean particle size attained of the silicone rubber obtained after the polymerization preferably falls within the range of 20 to 600 nm.

The emulsifying agent used in the latex of organosiloxane should not lose the activity as the emulsifying agent also in the acidic region, and the examples of such an emulsifying agent include e.g., alkylbenzenesulfonic acid, sodium alkylbenzenesulfonate, alkylsulfonic acid, sodium alkylsulfonate, sodium (di)alkylsulfosuccinate, sodium polyoxyethylene nonylphenyl ether sulfonate, sodium alkylsulfate, and the like. These may be used alone, or two or more thereof may be used in combination. For providing the acidic state, it is preferred that an inorganic acid such as sulfuric acid or hydrochloric acid, or an organic acid such as alkylbenzenesulfonic acid, alkylsulfonic acid or trifluoroacetic acid may be added to the system to adjust the pH of 1.0 to 3.0.

The polymerization temperature in producing the silicone rubber latex comprising the organosiloxane is preferably 60 to 120° C., and more preferably 70 to 100° C. because an appropriate polymerization speed can be attained.

The polyalkyl (meth)acrylate component that constitutes the composite rubber (b1) in the graft copolymer (B) used in the present invention is a polymer obtained by polymerization of the monomer component comprising a (meth)acrylic alkyl ester monomer as a principal component. It may be a polymer obtained by copolymerization of a monomer mixture comprising together with the (meth)acrylic alkyl ester monomer as a principal component, a polyfunctional monomer having two or more polymerizable unsaturated bonds within the molecule, and other copolymerizable monomer and the like, as needed. The polymerization process of the poly[alkyl (meth)acrylate] is not particularly limited, any process for polymerization by a common emulsion polymerization method using, for example, a radical polymerization initiator and also a chain transfer agent as needed (for example, methods described in Japanese Unexamined Patent Application Publication No. Sho 50-88169 and No. Sho 61-141746, and the like) etc., may be exemplified.

The (meth)acrylic alkyl ester monomer is a component that forms the main skeleton of the poly[alkyl (meth)acrylate] component. Specific examples thereof include e.g., acrylic alkyl esters having an alkyl group having 1 to 12 carbon atoms such as methyl acrylate, ethyl acrylate, propyl acrylate, butyl acrylate and 2-ethylhexyl acrylate; methacrylic alkyl esters having an alkyl group having 4 to 12 carbon atoms such as 2-ethylhexyl methacrylate and lauryl methacrylate, and the like. These monomers may be used alone, or two or more thereof may be used in combination. Among the (meth) acrylic alkyl ester monomer components, those containing preferably 40 to 100% by weight, and more preferably 60 to 100% by weight of butyl acrylate are preferred in light of low glass transition temperature of the resulting polymer, and economical efficiency. Also, in this case, as a copolymer component other than butyl acrylate, for example, methyl acrylate, ethyl acrylate, 2-ethylhexyl acrylate or the like may be included.

The polyfunctional monomer having two or more polymerizable unsaturated bonds within the molecule is a component that is used for introducing a cross-linked structure to the polyalkyl (meth)acrylate component particles and forming a network structure to allow the rubber elasticity to be developed, and in addition, for providing a graft active spot with the vinyl monomer to be graft polymerized. Specific examples thereof include e.g., diallyl phthalate, triallyl cyanurate, triallyl isocyanurate, allyl methacrylate, allyl acrylate, ethylene glycol dimethacrylate, diethylene glycol dimethacrylate, triethylene glycol dimethacrylate, propylene glycol dimethacrylate, 1,3-butylene glycol dimethacrylate, 1,4-butylene glycol dimethacrylate, divinylbenzene, and the like. These may be used alone, or two or more thereof may be used in combination. Among these, allyl methacrylate, triallyl cyanurate and triallyl isocyanurate are preferred in light of satisfactory crosslinking efficiency and graft efficiency.

In production of the polyalkyl (meth)acrylate component in the composite rubber (b1), the (meth)acrylic alkyl ester monomer is used in an amount of preferably 66.5 to 99.9% by weight, and more preferably 85 to 99.9% by weight in total amount of 100% by weight of the (meth)acrylic alkyl ester monomer, the polyfunctional monomer having two or more polymerizable unsaturated bonds within the molecule, and the other copolymerizable monomer. Further, the polyfunctional monomer having two or more polymerizable unsaturated bonds within the molecule is used in an amount of preferably 0.1 to 10% by weight, and more preferably 0.1 to 5% by weight. In addition, the other copolymerizable monomer is used in an amount of preferably 0 to 20% by weight, and more preferably 0 to 5% by weight. These components are used such that total amount thereof accounts for 100% by weight.

When the proportion of the used (meth)acrylic alkyl ester monomer is lower than 66.5% by weight, properties as a rubber may be deficient, and the effect of developing the impact resistance can be reduced. When the proportion is higher than 99.9% by weight, the proportion of the polyfunctional monomer having two or more polymerizable unsaturated bonds within the molecule becomes so low that the effect by the use thereof may not be achieved enough.

Moreover, when the proportion of the used polyfunctional monomer having two or more polymerizable unsaturated bonds within the molecule is lower than 0.1% by weight, the crosslinking density becomes so low that the effect of developing the impact resistance may be reduced. When the proportion is greater than 10% by weight, to the contrary, the crosslinking density becomes so high that the impact resistance is also apt to be lowered.

The other copolymerizable monomer is a component used for adjusting the refractive index and impact resistance, and the like, which may be added as needed to achieve a desired physical property. Examples of the same include e.g., methyl methacrylate, ethyl methacrylate, propyl methacrylate, glycidyl methacrylate, glycyl acrylate, hydroxylethyl methacrylate, benzyl methacrylate, methacrylic acid, acrylic acid, styrene, substituted styrene, acrylonitrile, and the like.

The composite rubber (b1) comprising the polyorganosiloxane component and the polyalkyl (meth)acrylate component can be obtained by, for example, seed polymerization of a monomer mixture for the polyalkyl (meth)acrylate component in the presence of a silicone rubber latex containing the aforementioned polyorganosiloxane. Also, to the contrary, it may be obtained by polymerization of the components used for production of the silicone rubber latex as they are, or through addition in the state of an emulsion, in the presence of the rubber latex of the polyalkyl (meth)acrylate component. Moreover, the composite rubber (b1) can be obtained by mixing the rubber latex of the polyorganosiloxane component with the rubber latex of the polyalkyl (meth)acrylate component, and adding to 100 parts by weight (solid content) of the mixed latex, 0.1 to 15 parts by weight (solid content) of an acid group-containing copolymer latex prepared by copolymerizing 1 to 30% by weight of an unsaturated acid monomer, 35 to 99% by weight of a (meth)acrylic ester monomer and 0 to 35% by weight of other monomer that is copolymerizable therewith, whereby allowing for aggregation and co-enlarging.

The ratio of the used polyorganosiloxane component and polyalkyl (meth)acrylate component is preferably 5/95 to 90/10, and more preferably 10/90 to 50/50 in terms of the weight ratio of the polyorganosiloxane component/polyalkyl (meth)acrylate component. When the ratio is less than 5/95, the amount of the alkyl (meth)acrylate component is too large, whereby the impact resistance is apt to be lowered. Additionally, when the ratio is greater than 90/10, polymerization inversion rate is significantly lowered, and thus the production efficiency is apt to be decreased due to remaining unreacted organosiloxane in large quantity.

The mean particle size of the composite rubber (b1) in the present invention is preferably 0.02 to 1.1 μm, and more preferably 0.03 to 1 μm in light of the development of the impact resistance. The mean particle size of the composite rubber in the present invention is an average value determined when the diameter of fifty particles was measured on a photograph for transmission electron microscopic observation.

The gel content of the composite rubber (b1) in the present invention is preferably equal to or greater than 70%, and more preferably equal to or greater than 80% in light of the development of the impact resistance.

The gel content in the present invention is a value determined as described below. First, a part of the rubber latex is subjected to salt precipitation, coagulation, separation, and washing, followed by drying at 40° C. for 15 hrs to obtain a rubber crumb. The crumb is immersed in toluene while agitation at room temperature for 8 hrs, and then subjected to centrifugal separation at 12,000 rpm for 60 min. The dry weight fraction that is insoluble in toluene is measured to determine the value as the gel content.

In the graft copolymer (B1), the vinyl monomer used in effecting the graft polymerization onto the composite rubber (b1) is not particularly limited, and specific preferable examples include e.g., vinyl cyanide monomers such as acrylonitrile and methacrylonitrile; aromatic vinyl monomers such as styrene, α-methylstyrene and para-methylstyrene; acrylic esters such as methyl acrylate, butyl acrylate, 2-ethylhexyl acrylate, glycidyl acrylate and hydroxyethyl acrylate; methacrylic esters such as methyl methacrylate, ethyl methacrylate, butyl methacrylate, glycidyl methacrylate and hydroxyethyl methacrylate, and the like. These may be used alone, or two or more thereof may be used in combination.

In the graft copolymer (B1), it is preferred that the vinyl monomer comprises 70 to 100% by weight of at least one vinyl monomer selected from the group consisting of a vinyl cyanide monomer, an aromatic vinyl monomer, an acrylic ester and a methacrylic ester, and 30 to 0% by weight of other vinyl monomer that is copolymerizable therewith. Examples of the other vinyl monomer include maleic anhydride, phenylmaleimide, methacrylic acid, acrylic acid, and the like. These may be used alone, or two or more thereof may be used in combination. More preferably, it comprises 10 to 100% by weight of the methacrylic alkyl ester monomer, 0 to 60% by weight of the acrylic alkyl ester monomer, 0 to 90% by weight of the aromatic vinyl monomer, 0 to 40% by weight of the vinyl cyanide monomer, and 0 to 20% by weight of the other vinyl monomer that is copolymerizable with these, with total amount of them accounting for 100% by weight.

The addition and polymerization of the vinyl monomer mixture in the graft polymerization of the vinyl monomer onto the composite rubber (b1) is not particularly limited, and may be carried out in one step, or may be carried out in multiple steps. The addition of the monomer mixture is not particularly limited, and it may be added together in a lump, added serially, added in two or more steps in divided portions, or added with combination of these.

In the present invention, the ratio of the amount of the used composite rubber (b1) and the vinyl monomer is preferably 5/95 to 95/5, and more preferably 50/50 to 90/10 in terms of the weight ratio of the composite rubber (b1)/the vinyl monomer. When the ratio is less than 5/95, the content of the rubber component is so small that sufficient impact resistance may not be developed. When the ratio is greater than 95/5, the amount of the monomer to be grafted is so small that the compatibility with the biodegradable (3-hydroxyalkanoate) copolymer (A) that is a matrix resin may be deteriorated in compounding therewith, whereby the impact resistance is apt to be also lowered.

The graft polymerization can be carried out by using a common emulsion polymerization method. The radical polymerization initiator and the chain transfer agent used in the polymerization can be any one generally employed.

Moreover, so-called free polymer prepared by polymerization of the vinyl monomer in a separate polymerization unit can be also added to the graft polymer. The graft composition and the free polymer composition may be the same or different. When they are different, it is preferred that these compositions should be compatible to one another in view of the physical properties.

The composite rubber graft copolymer (graft copolymer (B1)) following the polymerization may be used after isolating the polymer from the emulsion in compounding with the poly[(3-hydroxybutyrate)-co-(3-hydroxyhexanoate)], or may be used as it is in the emulsion. As the method of isolating the polymer, any common method, for example, a method in which a metal salt such as calcium chloride, magnesium chloride, magnesium sulfate or the like is added to the emulsion to allow for coagulation of the emulsion, followed by separation, washing with water, dehydration, and drying, and the like may be exemplified. In addition, a spray drying process can be used.

Next a graft copolymer (hereinafter, may also be referred to as "graft copolymer (B2)") obtained by graft polymerization of the vinyl monomer onto the acrylic rubber (b2) will be explained.

The graft copolymer (B2) is not particularly limited with respect to the structure thereof as long as it is a graft copolymer obtained by graft polymerization of the vinyl monomer onto the acrylic rubber (b2), but is preferably a core-shell type graft copolymer having the acrylic rubber (b2) as a core layer, and a layer constituted with the vinyl monomer as a shell layer.

In the core shell type graft copolymer, the acrylic rubber (b2) that forms the core layer may have a layer structure with only one layer, or may have a multilayer structure with two or more layers. Similarly, the polymer that forms the shell layer may also have a layer structure with only one layer, or may have a multilayer structure with two or more layers. Generally, the core-shell type graft polymer is obtained by graft copolymerization of a rubber polymer and a monomer mixture, and in many cases, obtained by graft copolymerization of a monomer mixture in the presence of a rubber latex containing a rubber polymer as the solid content.

It is preferred that the monomer that constitutes the acrylic rubber (b2) predominantly comprises an acrylic ester. In particular, the acrylic rubber (b2) predominantly constituted with an acrylic alkyl ester monomer is preferred. Further, it is particularly preferably a polymer obtained by polymerization of a monomer mixture comprising 50 to 100% by weight of the acrylic alkyl ester monomer when total weight of the monomer constituting the acrylic rubber (b2) is defined as 100% by weight. If necessary, 0 to 50% by weight of a monomer selected from the group consisting of an aromatic vinyl monomer, and a vinyl monomer that is copolymerizable with the acrylic alkyl ester monomer and/or the aromatic vinyl monomer may be included as the other component. Further, 0 to 5% by weight of a polyfunctional monomer having two or more polymerizable unsaturated bonds within the molecule may be also included as needed. The rubber latex containing an acrylic rubber can be obtained by subjecting the mixture of these monomers to, for example, emulsion polymerization. When the acrylic rubber is obtained by an emulsion polymerization method, the acrylic rubber as it is in the state of the rubber latex dispersed in an aqueous medium can be used in the graft copolymerization of the vinyl monomer.

Specific examples of the acrylic alkyl ester monomer include e.g., acrylic alkyl esters having an alkyl group having 1 to 8 carbon atoms such as methyl acrylate, ethyl acrylate, butyl acrylate, 2-ethylhexyl acrylate, and the like, but not limited thereto. These may be used alone, or two or more thereof may be used in combination.

The amount of the used acrylic alkyl ester monomer in the acrylic rubber (b2) is preferably 50 to 100% by weight, more preferably 60 to 95% by weight, and still more preferably 65 to 95% by weight when the total weight of the monomers that constitute the acrylic rubber (b2) is defined as 100% by weight. When the amount of the used acrylic alkyl ester monomer is less than 50% by weight, impact resistance of the finally obtained molded article may not be improved enough.

The aromatic vinyl monomer which may be included if necessary as the monomer that constitutes the acrylic rubber (b2) is a component having an action to improve transparency of the molded article finally obtained from the biodegradable resin composition of the present invention, and is a component for adjusting to give a small difference between the refractive index of the graft copolymer (B2) and the refractive index of the biodegradable (3-hydroxyalkanoate) copolymer (A). Specific examples of the aromatic vinyl monomer include e.g., styrene, α-methylstyrene, 1-vinylnaphthalene, 2-vinyinaphthalene and the like, but not limited thereto. However, for adjusting the refractive index, the aforementioned aromatic vinyl monomer may or may not be used.

In the acrylic rubber (b2), the aromatic vinyl monomer may be used within the range of 0 to 50% by weight based on 100% by weight as defined by total weight of the monomers that constitute the acrylic rubber (b2). When this amount exceeds 50% by weight, relative amount of the used acrylic alkyl ester monomer becomes so low that the acrylic rubber (b2) that is excellent in the impact resistance is apt to be hardly obtained. It should be noted that when importance is attached to the impact-resisting strength, the amount is preferably 0 to 25% by weight, and more preferably 0% by weight.

The difference in refractive indices between the biodegradable (3-hydroxyalkanoate) copolymer (A) and the graft copolymer (B2) obtained by graft polymerization of the vinyl monomer onto the acrylic rubber (b2) to be used in the present invention is preferably equal to or less than 0.02, and more preferably equal to or less than 0.017 in light of improvement of the transparency.

The vinyl monomer that is copolymerizable with the acrylic alkyl ester monomer and/or the aromatic vinyl monomer which may be included if necessary as the monomer that constitutes the acrylic rubber (b2) is a component for finely adjusting the compatibility of the graft copolymer (B2) with the biodegradable (3-hydroxyalkanoate) copolymer (A). Specific examples of these copolymerizable vinyl monomers include e.g., methacrylic alkyl esters having an alkyl group having 1 to 20 carbon atoms such as methyl methacrylate, ethyl methacrylate and butyl methacrylate; vinyl cyanide monomers such as acrylonitrile and methacrylonitrile; 4-hydroxybutyl acrylate, and the like, but not limited thereto.

In the acrylic rubber (b2), the vinyl monomer that is copolymerizable with the acrylic alkyl ester monomer and/or the aromatic vinyl monomer may be used in the range of 0 to 50% by weight when the total amount of the monomers constituting the acrylic rubber (b2) is defined as 100% by weight. Preferably, the vinyl monomer may be included at 0 to 10% by weight, and more preferably at 0% by weight. When the vinyl monomer is included exceeding 50% by weight, relative amount of the used acrylic alkyl ester monomer becomes so low that the acrylic rubber (b2) that is excellent in the impact resistance may be hardly obtained.

The polyfunctional monomer which may be included if necessary as the monomer that constitutes the acrylic rubber (b2) is a component for forming the cross-linked structure in the resulting acrylic rubber (b2). Specific examples of the polyfunctional monomer include e.g., divinylbenzene, allyl acrylate, allyl methacrylate, diallyl phthalate, triallyl cyanurate, triallyl isocyanurate, diacrylate-based compounds, dimethacrylate-based compounds and the like, but not limited thereto. In addition, a molecule having a radical polymerizable functional group at both ends referred to as macromer, for example, α,ω-dimethacryloyloxy polyoxyethylene can be also used as the polyfunctional monomer.

The polyfunctional monomer may be used in the range of 0 to 5% by weight when total weight of the monomers constituting the acrylic rubber (b2) is defined as 100% by weight. Preferably, it is included in an amount of 0.1 to 3% by weight. This amount exceeding 5% by weight is not preferred because the relative amount of the used acrylic alkyl ester monomer becomes so low that the acrylic rubber (b2) that is excellent in the impact resistance may be hardly obtained.

The method of obtaining the acrylic rubber (b2) in the present invention is not particularly limited, and a method may be employed in which: a monomer mixture containing a monomer of an acrylic alkyl ester, an aromatic vinyl monomer, a vinyl monomer that is copolymerizable with these monomers, and a polyfunctional monomer in each desired amount is compounded with an aqueous medium, a polymerization initiator, an emulsifying agent and the like; and the mixture is allowed to be polymerized by, for example, a common emulsion polymerization method, whereby the rubber is obtained in the state included in a rubber latex.

The addition and polymerization of the monomer mixture in obtaining the acrylic rubber (b2) is not particularly limited, and may be carried out in one step, or may be carried out in multiple steps. The procedure for adding the monomer mixture is not particularly limited, and it may be added together in a lump, added serially, or added in two or more steps in divided portions, or added with combination of these.

The foregoing monomer mixture can be also obtained in the form of a micelle by: introducing a monomer of an acrylic alkyl ester, an aromatic vinyl monomer, a vinyl monomer that is copolymerizable therewith, and a polyfunctional monomer each independently, or any combination of some of these separately into a reaction vessel to which an aqueous medium, an initiator, an emulsifying agent and the like had been introduced beforehand; and then mixing by stirring in the reaction vessel. In this case, the acrylic rubber (b2) can be obtained in the state included in the rubber latex by changing the condition in the reaction vessel to allow the polymerization to be initiated, for polymerizing the monomer mixture by, for example, a common emulsion polymerization method.

Thus obtained acrylic rubber (b2) preferably has a glass transition temperature of equal to or lower than 0° C., and more preferably equal to or lower than −30° C. When the acrylic rubber (b2) has a glass transition temperature exceeding 0° C., finally obtained molded article may fail to absorb impact when a great deformation velocity is applied.

In the aforementioned graft copolymer (B2), the vinyl monomer for use in graft polymerization onto the acrylic rubber (b2), in particular, the vinyl monomer that constitutes the shell layer of the core-shell type graft copolymer is not particularly limited, but preferably comprises 70 to 100% by weight of at least one vinyl monomer selected from the group consisting of a vinyl cyanide monomer, an aromatic vinyl monomer, an acrylic ester and a methacrylic ester, and 0 to 30% by weight of other vinyl monomer that is copolymerizable with the vinyl monomer. More preferably, it comprises 10 to 100% by weight of a methacrylic alkyl ester monomer, 0 to 60% by weight of an acrylic alkyl ester monomer, 0 to 90% by weight of an aromatic vinyl monomer, 0 to 40% by weight of a vinyl cyanide monomer, and 0 to 20% by weight of other vinyl monomer that is copolymerizable with the aforementioned vinyl monomer, with total amount of them accounting for 100% by weight.

The methacrylic alkyl ester monomer is a component that is preferable for improving the adhesiveness between the graft polymer and the biodegradable aliphatic polyester resin, and for enhancing the impact-resisting strength of the finally obtained molded article of the present invention. Specific examples of the methacrylic alkyl ester monomer include e.g., methacrylic alkyl esters having an alkyl group having 1 to 5 carbon atoms such as methyl methacrylate, ethyl methacrylate, butyl methacrylate and the like, but not limited thereto.

The methacrylic alkyl ester monomer can be used in the range of preferably 10 to 100% by weight, more preferably 20 to 100% by weight, and still more preferably 30 to 100% by weight when total weight of the vinyl monomer is defined as 100% by weight. When the amount of the methacrylic alkyl ester monomer is less than 10% by weight, the impact-resisting strength of the finally obtained molded article may not be sufficiently enhanced. In addition, by compounding methyl methacrylate in the methacrylic alkyl ester monomer in an amount of preferably 60 to 100% by weight, and more preferably 80 to 100% by weight, impact-resisting strength of the finally obtained molded article can be enhanced.

The acrylic alkyl ester monomer is a component for facilitating favorable dispersion of the graft polymer (B) in the biodegradable aliphatic polyester resin in the finally obtained molded article, and for enhancing the impact-resisting strength of the molded article by adjusting the softening temperature of the shell layer of the core-shell type graft copolymer. Specific examples of the acrylic alkyl ester monomer include e.g., acrylic alkyl esters having an alkyl group having 2 to 12 carbon atoms such as methyl acrylate, ethyl acrylate, butyl acrylate, 2-ethylhexyl acrylate and the like, but not limited thereto.

The acrylic alkyl ester monomer can be used in the range of 0 to 60% by weight, preferably 0 to 50% by weight, and more preferably 0 to 40% by weight when total weight of the vinyl monomer is defined as 100% by weight. When the amount of the acrylic alkyl ester monomer exceeds 60% by weight, relative amount of the used methacrylic alkyl ester monomer becomes so low that the impact-resisting strength of the finally obtained molded article may not be sufficiently enhanced.

The aromatic vinyl monomer has an action to improve the transparency of the finally obtained molded article, and thus is a component for adjusting the difference in the refractive index of the graft polymer (B) and the refractive index of the biodegradable aliphatic polyester resin so as to be as small as possible. Specific examples of the aromatic vinyl monomer include e.g., the monomers illustrated as the specific examples of the aromatic vinyl monomer, but not limited thereto.

The aromatic vinyl monomer can be used in the range of 0 to 90% by weight, preferably 0 to 50% by weight, and more preferably 0 to 30% by weight when total weight of the vinyl monomer is defined as 100% by weight. When the amount of the aromatic vinyl monomer exceeds 90% by weight, relative amount of the used methacrylic alkyl ester monomer becomes so low that the impact-resisting strength of the finally obtained molded article may not be sufficiently enhanced.

The vinyl cyanide monomer is a component for finely controlling the compatibility of the graft polymer with the biodegradable aliphatic polyester resin. Specific examples of the vinyl cyanide monomer include e.g., acrylonitrile, methacrylonitrile and the like, but not limited thereto. These may be used alone, or two or more thereof may be used in combination.

The vinyl cyanide monomer can be used in the range of 0 to 40% by weight, and more preferably 0% by weight when total weight of the vinyl monomer is defined as 100% by weight. When the amount of the vinyl cyanide exceeds 40% by weight, relative amount of the used methacrylic alkyl ester monomer becomes so low that the impact-resisting strength of the finally obtained molded article may not be sufficiently enhanced.

The other copolymerizable vinyl monomer is a component for improving compatibility with the biodegradable aliphatic polyester resin composition, and for improving the processability in molding. Specific examples of the other copolymerizable vinyl monomer include e.g., hydroxyethyl methacrylate, hydroxyethyl acrylate, 4-hydroxybutyl acrylate, glycidyl methacrylate, glycidyl acrylate, maleic anhydride, phenylmaleimide, methacrylic acid, acrylic acid, and the like, but not limited thereto.

The other copolymerizable vinyl monomer can be used in the range of 0 to 20% by weight, preferably 0 to 10% by weight, and more preferably 0% by weight when total weight of the vinyl monomer is defined as 100% by weight. When the amount of the copolymerizable vinyl monomer exceeds 20% by weight, relative amount of the used methacrylic alkyl ester monomer becomes so low that the impact-resisting strength of the finally obtained molded article may not be sufficiently enhanced.

The core-shell type graft copolymer is obtained by graft copolymerization of the acrylic rubber (b2) and the monomer mixture containing the vinyl monomer. The monomer mixture provides the shell layer of the core-shell type graft copolymer as a result of the graft copolymerization.

In the core-shell type graft copolymer, the proportion of the acrylic rubber (b2) that constitutes the core layer, and the vinyl polymer corresponding to the shell layer may be: the acrylic rubber (b2) of 5 to 95 parts by weight and the shell layer polymer of 95 to 5 parts by weight, and preferably the acrylic rubber (b2) of 50 to 95 parts by weight and the shell layer polymer of 50 to 5 parts by weight. The amount of the acrylic rubber (b2) being less than 5 parts by weight, and the shell layer polymer being more than 95 parts by weight are not preferred because the impact-resisting strength of the finally obtained molded article may not be sufficiently enhanced. In addition, when the amount of the acrylic rubber (b2) is more than 95 parts by weight, and the shell layer polymer is less than 5 parts by weight, adhesiveness between the graft copolymer (B2) and the biodegradable aliphatic polyester resin may be deprived, whereby the impact-resisting strength, and transparency of the finally obtained molded article of the present invention may not be sufficiently improved.

The method of obtaining the graft copolymer (B2), particularly the core-shell type graft copolymer, is not particularly limited, and a method may be employed in which a monomer mixture containing a methacrylic alkyl ester monomer, an acrylic alkyl ester monomer, an aromatic vinyl monomer, a vinyl cyanide monomer and a copolymerizable vinyl monomer in each desirable amount is added to a rubber latex comprising the acrylic rubber (b2) having a glass transition temperature of not higher than 0° C. prepared as described above, and then polymerization is allowed by a common polymerization method through compounding a polymerization initiator or the like to obtain a powdery graft polymer from the graft polymer latex.

The addition of the monomer mixture as the shell layer, and polymerization of the same are not particularly limited, and may be carried out in one step, or in multiple steps. The addition of the monomer mixture is not particularly limited, and may be added together in a lump, added serially, or added by dividing to carry out in two or more steps, and in combination of these procedures.

The particles in thus obtained core-shell type graft polymer latex may be recovered from the latex by salt precipitation through adding a common electrolyte or acid, coagulation, spraying and drying in a hot air. Moreover, washing, dehydration, and drying may be carried out by any common methods as needed.

Next, the diene rubber graft copolymerized polymer (hereinafter, may also be referred to as "graft copolymer (B3)") obtained by graft polymerization of the vinyl monomer onto the diene rubber (b3) constituted with the diene monomer will be explained.

The graft copolymer (B3) in the present invention is not particularly limited, but the weight ratio of the diene rubber (b3) and the vinyl monomer is preferably diene rubber (b3)/vinyl monomer=15/85 to 90/10 (wt/wt).

Although the diene rubber (b3) used in the graft copolymer (B3) of the present invention is not particularly limited, a rubber obtained by copolymerization of 50 to 100% by weight of a diene monomer, 50 to 0% by weight of other vinyl monomer that is copolymerizable with the diene monomer, and 0 to 5% by weight of a polyfunctional monomer having two or more nonconjugated double bonds within one molecule (wherein total of the diene monomer, the vinyl monomer and the polyfunctional monomer accounting for 100% by weight) is preferred.

Examples of the diene monomer include e.g., butadiene, isoprene, and the like. As the other vinyl monomer that is copolymerizable with the diene monomer, for example, a vinyl cyanide monomer, an aromatic vinyl monomer, an acrylic ester, a methacrylic ester, and the like may be exemplified. Examples of the polyfunctional monomer having two or more nonconjugated double bonds within one molecule include e.g., diallyl phthalate, triallyl cyanurate, triallyl isocyanurate, allyl methacrylate, allyl acrylate, ethylene glycol dimethacrylate, diethylene glycol dimethacrylate, propylene glycol dimethacrylate, 1,3-butylene glycol dimethacrylate, 1,4-butylene glycol dimethacrylate, divinylbenzene, and the like. These may be used alone, or two or more thereof may be used in combination.

Specific examples of the diene rubber (b3) include e.g., butadiene rubbers, styrene-butadiene rubbers, acrylonitrile-butadiene rubbers, acrylic ester-butadiene rubbers, methacrylic ester-butadiene rubbers, isoprene rubbers, and the like.

As the polymerization process of the diene rubber (b3), a solution polymerization method, or a bulk polymerization method is also acceptable, but an emulsion polymerization method is preferred because of ease in graft polymerization, in control of the rubber particle size, and in blending of the graft copolymer with the (3-hydroxyalkanoate) copolymer.

The emulsion polymerization method can be carried out by a known process, and the polymerization can be effected using for example, a diene monomer, an aqueous medium, and a known initiator such as a thermally degradable initiator such as potassium peroxide or benzoyl peroxide, or a redox initiator such as $FeSO_4$-reducing agent-organic peroxide or the like, as well as, if necessary, a chain transfer agent such as a mercaptan compound, an emulsifying agent, and the like.

As the emulsifying agent used in the polymerization of the diene rubber (b3), for example, higher fatty acid sodium, higher fatty acid potassium, alkylbenzenesulfonic acid, sodium alkylbenzenesulfonate, alkylsulfonic acid, sodium alkylsulfonate, sodium (di)alkylmsulfosuccinate, sodium polyoxyethylenenonylphenyl ether sulfonate, sodium alkylsulfate, and the like may be exemplified. These may be used alone, or two or more thereof may be used in combination.

The polymerization temperature in production of the rubber latex by the aforementioned emulsion polymerization is preferably 10 to 90° C., and more preferably 30 to 70° C., in light of the polymerization speed being appropriate.

The mean particle size of the diene rubber (b3) falls within the range of preferably 0.05 to 1 μm, and more preferably 0.1 to 0.6 μm. When the mean particle size of the diene rubber (b3) is less than 0.05 μm, the effect of improving the impact resistance is apt to be deficient, while when this size exceeds 1 μm, the diene rubber latex is apt to be unstable.

The mean particle size of the diene rubber (b3) in the present invention is an average value determined when the diameter of fifty particles was measured on transmission electron microscopic observation.

The gel content of the diene rubber (b3) in the rubber graft copolymer (B3) of the present invention is preferably equal to or greater than 50%, and more preferably equal to or greater than 70% in light of the development of the impact resistance.

The gel content can be determined by a similar method to that described in the section referring to the composite rubber (b1).

In the diene rubber graft copolymer (B3) of the present invention, the vinyl monomer used in graft polymerization onto the diene rubber (b3) is not particularly limited, and specific preferable examples include e.g., vinyl cyanide monomers such as acrylonitrile and methacrylonitrile; aromatic vinyl monomers such as styrene, α-methylstyrene and para-methylstyrene; acrylic esters such as methyl acrylate, butyl acrylate, glycidyl acrylate and hydroxyethyl acrylate; methacrylic esters such as methyl methacrylate, ethyl methacrylate, butyl methacrylate, glycidyl methacrylate and hydroxyethyl methacrylate, and the like. These may be used alone, or two or more thereof may be used in combination.

It is preferred that the vinyl monomer comprises 70 to 100% by weight of at least one vinyl monomer selected from the group consisting of a vinyl cyanide monomer, an aromatic vinyl monomer, an acrylic ester and a methacrylic ester, and 30 to 0% by weight of other vinyl monomer that is copolymerizable therewith in light of the compatibility with the (3-hydroxyalkanoate) copolymer (A). Examples of the other vinyl monomer that is copolymerizable with at least one vinyl monomer selected from the group consisting of a vinyl cyanide monomer, an aromatic vinyl monomer, an acrylic ester and a methacrylic ester include e.g., maleic anhydride, phenylmaleimide, methacrylic acid, acrylic acid, and the like. These may be used alone, or two or more thereof may be used in combination.

The weight ratio of the diene rubber (b3) and the vinyl monomer in the graft copolymer (B3) of the present invention is preferably 15/85 to 90/10 (wt/wt), and more preferably 40/60 to 80/20 in terms of the weight ratio of the diene rubber (b3)/vinyl monomer. When the ratio is less than 15/85, the content of the rubber component is so small that sufficient impact resistance may not be developed. When the ratio is greater than 90/10, the amount of the monomer to be grafted is so small that the compatibility with the biodegradable (3-hydroxyalkanoate) copolymer (A) that is a matrix resin may be deteriorated in compounding therewith, whereby the impact resistance is apt to be also lowered.

The graft polymerization can be carried out by using a common emulsion polymerization method. The radical polymerization initiator and the chain transfer agent used in the polymerization can be any one generally employed.

Moreover, so-called free polymer prepared by polymerization of the vinyl monomer in a separate polymerization unit may be added to the graft polymer, or can be also added in compounding poly[(3-hydroxybutyrate)-co-(3-hydroxyhexanoate)] and the diene rubber graft copolymer. The graft composition and the free polymer composition may be the same or different. When they are different, it is preferred that those composition be compatible to one another in light of the physical properties.

The graft copolymer particles following the polymerization may be used after isolating the polymer from the emulsion in compounding with the poly[(3-hydroxybutyrate)-co-(3-hydroxyhexanoate)], or may be used as it is in the emulsion. As the method of isolating the polymer, any common method, for example, a method in which a metal salt such as calcium chloride, magnesium chloride or magnesium sulfate, or an acid such as hydrochloric acid or sulfuric acid is added to the emulsion to allow for coagulation of the emulsion, followed by separation, washing with water, dehydration, and drying, and the like may be exemplified. In addition, a spray drying process can be also used.

The amount of the used graft copolymer (B) (i.e., graft copolymers (B1), (B2) and (B3)) in the present invention is 0.1 to 100 parts by weight based on 100 parts by weight of the biodegradable (3-hydroxyalkanoate) copolymer (A). The aforementioned amount is preferably 0.5 to 50 parts by weight, and more preferably 0.5 to 30 parts by weight. When the amount of the used graft copolymer (B) is less than 0.1 parts by weight, the effect of improving the impact resistance is apt to be inferior, while when the amount exceeds 100 parts by weight, the biodegradability may be inhibited, or the rubber component is included so much to give a soft matter.

In the present invention, by compounding the acrylic processing modifier (C), processability such as draw down property can be improved.

The draw down property in the present invention is a marker showing the tensile force in melting of the resin, and can be evaluated by measuring a time period, in T die sheet extrusion or the like, from the time point when the melt sheet is dropped from the outlet of the die until the time it reaches to the floor face.

The acrylic processing modifier (C) used in the present invention is a (co)polymer predominantly constituted with at least one monomer selected from the group consisting of an acrylic ester and a methacrylic ester.

The weight average molecular weight (Mw) of the acrylic processing modifier (C) used in the present invention is 500,000 to 10,000,000. In light of the effect of improving the extrusion processability, the molecular weight is preferably 1,000,000 to 10,000,000, and more preferably 5,000,000 to 10,000,000. When the weight average molecular weight of the acrylic processing modifier (C) is less than 500,000, improvement of the draw down property is apt to be insufficient, while when the weight average molecular weight of the acrylic processing modifier (C) exceeds 10,000,000, the surface smoothness of the molded article is apt to be deteriorated. The weight average molecular weight of the acrylic processing modifier (C) represents the weight average molecular weight in terms of the polystyrene equivalent determined by gel permeation chromatography (GPC). Specifically, for example, it can be determined as a molecular weight in terms of the polystyrene equivalent measured with a GPC system manufactured by Waters Corporation equipped with a column Shodex K-804 (polystyrene gel) manufactured by Showa Denko K. K., using chloroform as a mobile phase.

Examples of the acrylic ester constituting the acrylic processing modifier (C) used in the present invention include e.g., methyl acrylate, ethyl acrylate, propyl acrylate, isopropyl acrylate, n-butyl acrylate, isobutyl acrylate, 2-ethylhexyl acrylate, s-butyl acrylate, t-butyl acrylate, neopentyl acrylate, isodecyl acrylate, lauryl acrylate, tridecyl acrylate, stearyl acrylate, benzyl acrylate, tetrahydrofurfuryl acrylate, methoxyethyl acrylate, dimethylaminoethyl acrylate, chloroethyl acrylate, trifluoroethyl acrylate, heptadecafluorooctylethyl acrylate, isobornyl acrylate, adamantyl acrylate, tricyclodecenyl acrylate, and the like. If necessary, acrylic acid can be also used.

Examples of the methacrylic ester constituting the acrylic processing modifier (C) used in the present invention include e.g., methyl methacrylate, ethyl methacrylate, n-butyl methacrylate, isobutyl methacrylate, 2-ethylhexyl methacrylate, propyl methacrylate, isopropyl methacrylate, isobutyl methacrylate, s-butyl methacrylate, t-butyl methacrylate, neopentyl methacrylate, ethylhexyl methacrylate, isodecyl methacrylate, lauryl methacrylate, tridecyl methacrylate, stearyl methacrylate, benzyl methacrylate, tetrahydrofurfuryl methacrylate, methoxyethyl methacrylate, dimethylaminoethyl methacrylate, chloroethyl methacrylate, trifluoroethyl methacrylate, heptadecafluorooctylethyl methacrylate, isobornyl methacrylate, adamantyl methacrylate, tricyclodecenyl methacrylate, and the like. If necessary, methacrylic acid can be also used.

Among them, it is preferred that the acrylic processing modifier (C) predominantly comprises a copolymer constituted with an acrylic ester and a methacrylic ester, and more preferably, a copolymer of butyl acrylate and methyl methacrylate, or a copolymer of butyl methacrylate and methyl methacrylate, in light of excellent surface smoothness of the molded article. In addition, with respect to the composition of the copolymer of butyl acrylate and methyl methacrylate, or the copolymer of butyl methacrylate and methyl methacrylate, homogenous composition may be polymerized, or the composition ratio may be altered. For example, polymerization may be conducted with a composition having a higher content of methyl methacrylate in the first step, and mixed monomers of butyl acrylate and methyl methacrylate with a larger amount of butyl acrylate may be polymerized in the second step.

Also, the acrylic processing modifier (C) of the present invention may be a copolymer which can be obtained by copolymerizing a monomer mixture of, together with the (meth)acrylic ester monomer as a principal component, a polyfunctional monomer having two or more polymerizable unsaturated bonds within the molecule, or other copolymerizable monomer, as needed.

The difference in the refractive indices between the biodegradable (3-hydroxyalkanoate) copolymer (A) and the acrylic processing modifier (C) used in the present invention is preferably equal to or less than 0.02, and more preferably equal to or less than 0.017 in light of improvement of the transparency.

The polymerization process of the acrylic copolymer in the acrylic processing modifier (C) of the present invention is not particularly limited, but for example, a process for polymerizing by a common emulsion polymerization method (for example, methods described in Japanese Unexamined Patent Application Publication No. Sho 50-88169, No. Sho 61-141746, and No. Hei 4-266958 and the like) using a radical polymerization initiator and, if necessary, a chain transfer agent, and the like may be exemplified.

Herein, the term "predominantly" means that the acrylic copolymer is included at a rate of 50% by weight or more in the acrylic processing modifier.

In the present invention, the acrylic processing modifier (C) may be used alone, or two or more thereof may be used in combination.

The amount of the used acrylic processing modifier (C) in the present invention is preferably 0.1 to 30 parts by weight, more preferably 0.5 to 20 parts by weight, and still more preferably 0.5 to 10 parts by weight based on 100 parts by weight of the biodegradable (3-hydroxyalkanoate) copolymer (A). When the amount of the used acrylic processing modifier (C) is less than 0.1 parts by weight, the effect of improving the processability is apt to be decreased, while when the amount exceeds 30 parts by weight, the biodegradability is apt to be inhibited.

In the present invention, use of the graft copolymer (B) and the acrylic processing modifier (C) in combination results in enhancement of the effect of improving the processability such as draw down property, and also, the impact resistance and the like are concomitantly enhanced. When the difference in refractive indices is small, and the filler is not used, the transparency is also improved.

In the resin composition of the present invention, moldability can be further improved by adding a nucleating agent.

The nucleating agent used in the present invention may be a higher fatty acid amide, an urea derivative, a sorbitol compound, a boron nitride, a higher fatty acid salt, an aromatic fatty acid salt or the like. Because of the excellent effect, the higher fatty acid amide, the urea derivative, and the sorbitol compound are preferred.

The aforementioned higher fatty acid amide is preferably a fatty acid amide having 10 to 50 carbon atoms per molecule, and for example, behenic acid amide, oleic acid amide, erucic acid amide, stearic acid amide, palmitic acid amide, N-stearylbehenic acid amide, N-stearylerucic acid amide, ethylenebisstearic acid amide, ethylenebisoleic acid amide, ethylenebiserucic acid amide, ethylenebislauryl acid amide, ethylenebiscapric acid amide, p-phenylenebisstearic acid amide, a polycondensation product of ethylene diamine, stearic acid and sebacic acid, and the like may be exemplified. Particularly, behenic acid amide is preferred.

As the urea derivative, bis(stearylureide)hexane, 4,4'-bis(3-methylureide)diphenylmethane, 4,4'-bis(3-cyclohexylureide)diphenylmethane, 4,4-bis(3-cyclohexylureide)dicyclohexylmethane, 4,4'-bis(3-phenylureide)dicyclohexylmethane, bis(3-methylcyclohexylureide)hexane, 4,4'-bis(3-decylureide)diphenylmethane, N-octyl-N'-phenylurea, N,N'-diphenylurea, N-tolyl-N'-cyclohexylurea, N,N-dicyclohexylurea, N-phenyl-N'-tribromophenylurea, N-phenyl-N'-tolylurea, N-cyclohexyl-N'-phenylurea, and the like may be illustrated, and particularly bis(stearylureide)hexane is preferred.

Examples of the sorbitol compound include 1,3,2,4-di(p-methylbenzylidene)sorbitol, 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorbenzylidenesorbitol, 1,3-p-chlorbenzylidene-2,4-benzylidenesorbitol, 1,3-p-chlorbenzylidene-2,4-p-methylbenzylidenesorbitol, 1,3-p-chlorbenzylidene-2,4-p-ethylbenzylidenesorbitol, 1,3-p-methylbenzylidene-2,4-p-chlorbenzylidenesorbitol, 1,3-p-ethylbenzylidene-2,4-p-chlorbenzylidenesorbitol, 1,3,2,4-di(p-chlorbenzylidene)sorbitol, and the like. Among these, 1,3,2,4-di(p-methylbenzylidene)sorbitol, and 1,3,2,4-dibenzylidenesorbitol are preferred.

The amount of the used nucleating agent in the resin composition of the present invention is preferably 0.1 to 10 parts by weight, more preferably 0.2 to 8 parts by weight, and still more preferably 0.5 to 5 parts by weight based on 100 parts by weight of total amount of the (3-hydroxyalkanoate) copolymer (A), the graft copolymer (B) and the acrylic processing modifier (C), in light of the moldability. When the amount of the nucleating agent is less than 0.1 parts by weight, the effect as the nucleating agent can be insufficient, while the amount exceeding 10 parts by weight is not economically preferable since the effect can be saturated.

In addition, mean crystal particle size of the resin composition of the present invention is preferably equal to or less than 50 µm, in light of improvement of the impact resistance, tensile properties, transparency, and the like.

In the resin composition of the present invention, the modulus of elasticity in flexure, heat resistance and the like can be further improved by further adding the filler.

Among the aforementioned fillers, examples of the inorganic filler include carbon black, calcium carbonate, silicon oxide and silicic acid salts, zinc white, Hycite clay, kaolin, basic magnesium carbonate, mica, talc, quartz powder, diatomaceous earth, dolomite powder, titanium oxide, zinc oxide, antimony oxide, barium sulfate, calcium sulfate, alumina, calcium silicate and the like, and particularly, mica and talc having a particle size of 0.1 to 30 µm are preferred. In addition, examples of the other filler include inorganic fibers such as carbon fiber, and organic fibers such as human hair and sheep wool. Moreover, natural fibers such as bamboo fibers, pulp fibers, kenaf fibers, analogous other plant alternatives, annual herb plants of genus *Hibiscus* in family Malvaceae, annual herb plants of family Tiliaceae, and the like can be also used. In light of reduction in carbon dioxide, natural fibers of plant origin are preferred, and particularly, kenaf fibers are preferred.

The amount of the used filler in the resin composition of the present invention is preferably 0.1 to 100 parts by weight, more preferably 0.1 to 80 parts by weight, and still more preferably 0.1 to 50 parts by weight based on 100 parts by weight of total amount of the (3-hydroxyalkanoate) copolymer (A), the graft copolymer (B) and the acrylic processing modifier (C), in light of physical properties, moldability, and costs. When the filler amount is less than 0.1 parts by weight, less improvement of the physical properties is likely to be achieved, while the filler amount exceeding 100 parts by weight is apt to result in lowering of the impact strength.

To the resin composition of the present invention can be added a known thermoplastic resin, or thermosetting resin in the range not to inhibit the effect of the present invention. Typical examples of the thermoplastic resin include general-purpose thermoplastic resins such as polyolefin-based resins like polypropylene and polyethylene, polyvinyl chloride-based resins, polystyrene-based resins, ABS-based resins and the like, as well as general-purpose engineering plastics such as polyethylene terephthalate-based resins, polybutylene terephthalate-based resins, polycarbonate-based resins, polyamide-based resins and the like. In addition, epoxy resins and the like may be exemplified as a typical thermosetting resin. In addition thereto, any of known resin modifiers, processability improving agents can be used.

Into the resin composition of the present invention can be compounded a variety of additives, for example, a colorant such as a pigment or a dye, an odor absorbent such as activated charcoal or zeolite, a flavor such as vanillin or dextrin, a stabilizer such as an antioxidant or an ultraviolet absorber, a lubricant, a release agent, a water repellent agent, an antimicrobial agent, and other secondary additive as needed. The aforementioned additives may be used alone, or two or more thereof may be used in combination.

A plasticizer can be also used in combination, in the resin composition of the present invention in the range not to inhibit the effect of the present invention. Use of the plasticizer enables the melt viscosity during heat processing, particularly during extrusion processing to be lowered, and can suppress the lowering of the molecular weight due to heat generation or the like upon shearing. In some cases, improvement of rate of the crystallization can be expected, and further, when a film or a sheet is obtained as the molded article, elongation and the like can be imparted.

Although the plasticizer is not particularly limited, the followings can be illustrated. As the plasticizer of the biodegradable (3-hydroxyalkanoate) copolymer, ether-based plasticizers, ester-based plasticizers, phthalic acid-based plasticizers, phosphorus-based plasticizers and the like are preferred, and the ether-based plasticizers and the ester-based plasticizers are more preferred in light of excellent compatibility with the biodegradable (3-hydroxyalkanoate) copolymer.

As the ether-based plasticizer, for example, polyoxyalkylene glycols such as polyethylene glycol, polypropylene glycol, polytetramethylene glycol and the like can be exemplified.

In addition, as the ester-based plasticizer, esters of an aliphatic dicarboxylic acid with an aliphatic alcohol may be exemplified. As the aliphatic dicarboxylic acid, for example, oxalic acid, succinic acid, sebacic acid, adipic acid and the like may be exemplified. As the aliphatic alcohol, for example, monohydric alcohols such as methanol, ethanol, n-propanol, isopropanol, n-hexanol, n-octanol, 2-ethylhexanol, n-dodecanol, and stearyl alcohol; dihydric alcohols such as ethylene glycol, 1,2-propylene glycol, 1,3-propylene glycol, 1,4-butanediol, 1,5-pentanediol, 1,6-hexanediol, diethylene glycol, neopentyl glycol, and polyethylene glycol; as well as polyhydric alcohols such as glycerin, trimethylolpropane, pentaerythritol and the like may be exemplified. Additionally, any copolymer such as a di-copolymer, a tri-copolymer, a tetra-copolymer and the like including any combination of two or more of the aforementioned polyether and polyester, as well as blends of two or more selected from these homopolymers, copolymers and the like may be exemplified. Furthermore, esterified hydroxycarboxylic acid and the like may be also suggested. The aforementioned plasticizer may be used alone, or two or more thereof may be used in combination.

The resin composition of the present invention can be produced by a known method. For example, as the method of heat melting and mixing, mixing by mechanical agitation with a single screw extruder, a twin screw extruder, a kneader, a gear pump, a kneading roll, a tank having a stirrer or the like, or application of a static mixer in which dividing and joining of the flow are repeated by a flow guide apparatus may be exemplified. In the case of heat melting, it is necessary to mix with attention to lowering of the molecular weight resulting from thermal degradation. In addition, there is also a method for obtaining the resin composition of the present invention comprising dissolving in a solvent to permit dissolution, and thereafter removing the solvent.

The resin composition of the present invention can be processed by injection molding, or extrusion molding using the extrusion molding machine as described above to subject to the processing to form into the shape of pellet, block, film, sheet or the like. Also, after pelletizing once so as to provide favorable dispersibility of various components, the product may be processed into the shape of film or sheet by an injection molding machine or an extrusion molding machine. Alternatively, processing to obtain a film or sheet is enabled with a calender molding machine, a roll molding machine, or an inflation molding machine. Moreover, the film or the sheet obtained from the composition of the present invention can be subjected to thermal molding by heat, vacuum molding, press molding or the like. In addition, the composition can be subjected to hollow molding by a blow molding machine. Further, it can be formed into fibers by melt spinning or the like.

The resin composition of the present invention is formed into a variety of molded articles such as fiber, string, rope, woven fabric, knit fabric, nonwoven fabric, paper, film, sheet, tube, plate, bar, vessel, bag, accessory, foam and the like, which may be used alone. Alternatively, it can be used by combining with a variety of fiber, string, rope, woven fabric, knit fabric, nonwoven fabric, paper, film, sheet, tube, plate, bar, vessel, bag, accessory, foam or the like constituted with a simple substance other than this composition to improve the physical property of the simple substance. The molded article obtained in this manner can be suitably used in fields such as agriculture, fishery, forestry, horticulture, medicine, sanitary goods, food industry, clothing, nonclothing, packaging, automobile, building material, and others.

Effects of the Invention

The present invention can provide a resin composition that can contribute to prevention of global warming in view of carbon neutrality and is excellent in impact resistance, tensile propertyis, transparency, processability such as draw down property and the like by compounding a certain graft copolymer and acrylic processing modifier in a biodegradable poly (3-hydroxyalkanoate). Additionally, when a filler or the like is included, a resin composition that is further excellent in flexural modulus of elasticity and heat resistance can be provided.

BEST MODE FOR CARRYING OUT THE INVENTION

Next, the resin composition of the present invention, and the molded article thereof will be explained in more detail by way of Examples, but the present invention is not limited just to these Examples. The expression "part" represents part by weight.

First Embodiment

The resins and additives used in this Embodiment are abbreviated as follows.
PHBH: poly[(3-hydroxybutyrate)-co-(3-hydroxyhexanoate)]
PA-60: acrylic processing modifier, Mw=8,000,000 (manufactured by KANEKA CORPORATION)
talc: mean particle size being about 7 μm (manufactured by NIPPON TALC Co., Ltd., trade name: K-1),
antioxidant IR-1010: hindered phenolic antioxidant (manufactured by Ciba Specialty Chemicals Holding Inc., trade name: IRGANOX-1010)
MMA: methyl methacrylate
BA: butyl acrylate
ST: styrene
AN: acrylonitrile
BMA: butyl methacrylate
KPS: potassium persulfate
SFS: sodium formaldehyde sulfoxylate dihydrate (rongalite)
EDTA: ethylenediaminetetraacetic acid disodium salt Evaluation method in this embodiment is as follows.

<Determination of Weight Average Molecular Weight>

The molecular weight in terms of the polystyrene equivalent was determined with a GPC system manufactured by Waters Corporation equipped with a column Shodex K-804 (polystyrene gel) manufactured by Showa Denko K. K., using chloroform as a mobile phase.

<Determination of Particle Size of Composite Rubber>

A thin piece cut out from the obtained sheet was stained with ruthenium, and observed with a transmission electron microscope. Particle size of fifty particles was measured, and the average value was adopted.

<Determination of Gel Content>

A part of the rubber latex was subjected to salt precipitation, coagulation, separation, and washing, followed by drying at 40° C. for 15 hrs to obtain a rubber crumb. The crumb was immersed in toluene while agitation at room temperature for 8 hrs, and then subjected to centrifugal separation at 12,000 rpm for 60 min. The dry weight fraction that was insoluble in toluene was measured.

<Evaluation of Draw Down Property>

The resulting resin composition pellet was extruded using a single screw extruder, LABO PRASTOMILL (manufactured by Toyo Seiki Seisaku-sho, Ltd., type 20C200) equipped with a T die having a width of 150 mm and a lip of 0.25 mm at a processing temperature of 160° C. and a screw (rotation) speed of 10 rpm. Then, a time period during which the resin starts to be discharged from the die until and it reaches to the ground 950 mm below was measured. When the draw down property is favorable, thus determined time would be prolonged.

<Tensile Test (Measurement of Tensile Fracture Stress, Tensile Fracture Strain)>

A dumbbell for testing was punched out from the obtained sheet, and tensile fracture stress and tensile fracture strain were measured using an autograph (manufactured by Shimadzu Corporation), in accordance with JIS K7161. Measurement of the value was made with respect to the longitudinal direction (MD) in production of the sheet.

<Evaluation of Dupont Impact Resistance>

To the obtained sheet was dropped down a weight of 500 g using a hemispheric jig of ½ inch from the height of 30 cm. Breakage of the sheet was visually evaluated.

(Evaluation Standards)

AA: entire whitening alone, with no breakage occurred. Further, no breakage occurred even though the weight was dropped down from the height of 40 cm;

A: entire whitening;

B: only partial whitening, with partial breakage; and

C: broken in pieces.

<Measurement of Modulus of Elasticity in Flexure>

The resulting resin composition pellet was subjected to injection molding using a 75-ton injection molding machine manufactured by Toshiba Corporation at an injection temperature of 190° C. to produce a ¼ inch-bar. The modulus of elasticity in flexure of thus resulting ¼ inch-bar was measured using an autograph (manufactured by Shimadzu Corporation), in accordance with JIS K7203.

<Measurement of Heat Resistance>

The resulting resin composition pellet was subjected to injection molding using a 75-ton injection molding machine manufactured by Toshiba Corporation at an injection temperature of 190° C. to produce a ¼ inch-bar. The heat deflection temperature (HDT) of thus resulting ¼ inch-bar under a load of 0.45 MPa was measured in accordance with JIS K7207 (A method).

PRODUCTION EXAMPLE 1

(A) Synthesis of Poly[(3-hydroxybutyrate)-co-(3-hydroxyhexanoate)]

PHBH having an HH rate (molar fraction (mol %) of (3-hydroxyhexanoate) in PHBH) of 7 mol % or 12 mol %, and a weight average molecular weight of each about 700,000 was used which was produced using Alcaligenes eutrophus AC32 (J. Bacteriol., 179, 4821 (1997)), which had been prepared by introducing a PHA (polyhydroxyalkanoate) synthetic enzyme gene derived from Aeromonas caviae into Alcaligenes eutrophus as a microorganism, through appropriately adjusting the raw material and culture conditions.

(B) Synthesis of Composite Rubber Graft Copolymer (1) Synthesis of Rubber (1-1) PRODUCTION EXAMPLE 2
[PRODUCTION OF POLYORGANOSILOXANE LATEX (S-1)]

A siloxane mixture in an amount of 100 parts was obtained by mixing 1 part of tetraethoxysilane, 1.5 parts of γ-methacryloyloxypropyldimethoxymethylsilane and 97.5 parts of octamethylcyclotetrasiloxane. To 200 parts of distilled water including 1 part of sodium dodecylbenzenesulfonate and 1 part of dodecylbenzenesulfonic acid dissolved therein was added 100 parts of the siloxane mixture. After the mixture was preliminarily agitated with a homo mixer at 10,000 rpm, an organosiloxane latex was obtained by emulsification and dispersion with a homogenizer under a pressure of 300 kg/cm$^2$. Thus resulting organosiloxane latex was transferred to a 8-L separable flask equipped with a capacitor and an agitation paddle, and heated while mixing by stirring at 90° C. for 5 hrs, followed by leaving to stand at 20° C. Forty eight hours later, the mixture of the latex was neutralized to give a pH of 7.5 using an aqueous sodium hydroxide solution to complete the polymerization. Thus, polyorganosiloxane rubber latex S-1 was obtained. Rate of polymerization of the resulting polyorganosiloxane rubber was 89%, and the mean particle size of the polyorganosiloxane rubber was 0.15 µm.

(1-2) PRODUCTION EXAMPLE 3
[PRODUCTION OF COMPOSITE RUBBER (SR-1)]

The polyorganosiloxane rubber latex S-1 was collected so as to give the solid content of 10 parts, and was placed in a 8-L separable flask equipped with a stirrer. Thereto was added 180 parts of distilled water. Following nitrogen substitution, the temperature of the mixture was elevated to 40° C. A mixture of 65 parts of butyl acrylate, 0.65 parts of allyl methacrylate and 0.065 parts of cumene hydroperoxide was charged, followed by agitation for 30 min. This mixture was allowed to infiltrate into the polyorganosiloxane rubber particles. Then, a mixture of 0.0025 parts of ferrous sulfate, 0.01 parts of EDTA, 0.3 parts of SFS and 5 parts of distilled water was charged to initiate the radical polymerization. Thereafter, the inner temperature was kept at 70° C. for 2 hrs. Completion of the polymerization gave a composite rubber latex. A part of this latex was collected, and measurement of the mean particle size of the composite rubber revealed a value of 0.22 µm. The gel content was 94%.

(2) PRODUCTION EXAMPLE 4 [PRODUCTION OF COMPOSITE RUBBER GRAFT COPOLYMER (G-1 TO 3)]

Using the composite rubber SR-1, graft polymerization onto the composite rubber was carried out by adding water to give the amount of 200 parts while agitation in a nitrogen stream and keeping at 60° C., followed by adding 0.2 parts of SFS, and adding 25 parts of the mixture of the vinyl monomer shown in Table 1 dropwisely over 2.5 hrs and then keeping at 60° C. for 1.5 hrs to complete the polymerization. To thus resulting composite rubber graft copolymer latex was added 1.5 parts of calcium chloride, and the yielded coagulated matter was separated and washed, which was then dried to obtain a powdery composite rubber graft copolymer (G-1 to 3).

TABLE 1

| Composite rubber graft copolymer (B) | Composite rubber | | Vinyl monomer | | | |
|---|---|---|---|---|---|---|
| | Rubber form | (part) | MMA (part) | BA (part) | ST (part) | AN (part) |
| G-1 | SR-1 | 75 | 20 | 5 | | |
| G-2 | SR-1 | 75 | 15 | | 10 | |
| G-3 | SR-1 | 75 | 10 | | 10 | 5 |

PRODUCTION EXAMPLE 5

(C) Synthesis of Acrylic Processing Modifier (P-1 to 3)

To a reactor equipped with a stirrer were charged potassium persulfate in an amount shown in Table 2 and 2 parts of sodium dodecylbenzenesulfonate previously dissolved in water, to which water was further added to give total amount of water of 200 parts. Nitrogen substitution in the reactor was carried out to eliminate oxygen in the void space and water, and the temperature of the content was elevated to 60° C. while agitation of the liquid. The monomer mixture shown in Table 2 was added over 5 hrs. Also after completing the addition of the monomer mixture, the content was stirred as it is still keeping at 60° C. for one hour and 30 min to complete the polymerization. Thereafter, the mixture was cooled to obtain a polymer latex. This latex was subjected to salt precipitation with sodium chloride to allow for coagulation, followed by filtration, washing with water, and drying to obtain a powder acrylic processing modifier (P-1 to 3). Polymerization average molecular weight of the resulting acrylic processing modifier is shown in Table 2.

TABLE 2

| Acrylic processing modifier (C) | Polymerization composition | | | | Copolymer molecular weight (×10,000) |
|---|---|---|---|---|---|
| | KPS (part) | MMA (part) | BA (part) | BMA (part) | |
| P-1 | 0.1 | 85 | 15 | | 100 |
| P-2 | 0.05 | 70 | | 30 | 180 |
| P-3 | 0.01 | 70 | | 30 | 320 |

EXAMPLES 1 TO 10

A mixture of poly[(3-hydroxybutyrate)-co-(3-hydroxyhexanoate)] [PHBH], the composite rubber graft copolymer, the acrylic processing modifier, the nucleating agent and the inorganic filler with a compounding proportion shown in Table 3 was subjected to melt kneading using a twin screw extrusion molding machine (manufactured by Japan Steel Works, Ltd., TEX33, ϕ33 mm) at a cylinder preset temperature of 170° C., whereby a composition pellet was obtained. Thus resulting pellet of the composition was extruded using a single screw extruder, LABO PRASTOMILL (manufactured by Toyo Seiki Seisaku-sho, Ltd., type 20C200) equipped with a T die having a width of 150 mm and a lip of 0.25 mm at a processing temperature of 160° C. and a screw speed of 10 rpm, whereby a sheet having a thickness of 0.1 mm was obtained. The draw down property in extrusion was evaluated according to the method as described above. Using thus obtained sheet, evaluation on tensile property, Dupont impact resistance, modulus of elasticity in flexure, and heat resistance was made. The results are shown in Table 4.

COMPARATIVE EXAMPLES 1 TO 3

A variety of evaluations were made by similar operations to those in Examples 1 to 7 with the compounding proportion shown in Table 3. The results are shown in Table 4.

TABLE 3

| | Resin composition | | | | | | | |
|---|---|---|---|---|---|---|---|---|
| | PHBH HH rate 7 mol % (part) | PHBH HH rate 12 mol % (part) | Composite rubber graft copolymer (B1) | | Acrylic processing modifier (C) | | Talc (mean particle size 7 μm) (part) | Behenic acid amide Incroslip B (part) | Antioxidant IR-1010 (part) |
| | | | type | (part) | type | (part) | | | |
| Example-1 | 100 | | G-1 | 10 | P-3 | 3 | | 2 | 0.2 |
| Example-2 | | 100 | G-1 | 10 | P-3 | 3 | | 2 | 0.2 |
| Example-3 | | 100 | G-1 | 10 | P-3 | 3 | 10 | 2 | 0.2 |
| Example-4 | | 100 | G-2 | 10 | P-3 | 3 | | 2 | 0.2 |
| Example-5 | | 100 | G-3 | 10 | P-3 | 3 | | 2 | 0.2 |
| Example-6 | | 100 | G-1 | 10 | P-2 | 3 | | 2 | 0.2 |
| Example-7 | | 100 | G-1 | 10 | P-1 | 3 | | 2 | 0.2 |
| Example-8 | | 100 | G-1 | 10 | PA60 | 3 | | 2 | 0.2 |
| Example-9 | | 100 | G-1 | 30 | P-3 | 3 | | 2 | 0.2 |
| Example-10 | | 100 | G-1 | 10 | P-3 | 15 | | 2 | 0.2 |
| Compar. Ex.-1 | | 100 | | 0 | P-3 | 3 | | 2 | 0.2 |
| Compar. Ex.-2 | | 100 | G-1 | 10 | | 0 | | 2 | 0.2 |
| Compar. Ex.-3 | | 100 | | 0 | | 0 | | 2 | 0.2 |

TABLE 4

| | Draw down characteristic (sec) | Tensile fracture strain <MD> (%) | Tensile fracture stress <MD> (MPa) | Dupont impact resistance Visual evaluation | Modulus of elasticity in flexure (MPa) | Heat resistance (° C.) |
|---|---|---|---|---|---|---|
| | | | Evaluation results | | | |
| Example-1 | 78 | 290 | 21 | B | 1000 | 109 |
| Example-2 | 80 | 340 | 23 | A | 680 | 91 |
| Example-3 | 82 | 50 | 24 | B | 900 | 96 |
| Example-4 | 77 | 310 | 22 | A | 680 | 92 |
| Example-5 | 76 | 270 | 20 | A | 685 | 91 |
| Example-6 | 73 | 300 | 21 | A | 680 | 90 |
| Example-7 | 66 | 260 | 19 | A | 670 | 90 |
| Example-8 | 85 | 360 | 24 | A | 690 | 92 |
| Example-9 | 90 | 460 | 15 | AA | 470 | 84 |
| Example-10 | 95 | 390 | 25 | B to A | 720 | 93 |
| Compar. Ex.-1 | 74 | 300 | 24 | C | 865 | 98 |
| Compar. Ex.-2 | 45 | 260 | 22 | A | 750 | 88 |
| Compar. Ex.-3 | 30 | 21 | 20 | C | 850 | 96 |

Second Embodiment

The resins and additives used in this Embodiment are as follows.

PHBH: poly[(3-hydroxybutyrate)-co-(3-hydroxyhexanoate)] (HH rate: 12 mol %, refractive index: 1.485)

M-400: core-shell type graft copolymer comprising an acrylic rubber as a core layer, and a polymer constituted with a vinyl monomer as a shell layer (manufactured by KANEKA CORPORATION, refractive index: 1.468)

nucleating agent: behenic acid amide (manufactured by CRODA KK, trade name: Incroslip B)

PA-10: acrylic processing modifier, Mw=800,000 (manufactured by KANEKA CORPORATION, refractive index: 1.489)

PA-20: acrylic processing modifier, Mw=1,000,000 (manufactured by KANEKA CORPORATION, refractive index: 1.489)

PA-60: acrylic processing modifier, Mw=8,000,000 (manufactured by KANEKA CORPORATION, refractive index: 1.485)

antioxidant: hindered phenolic antioxidant (manufactured by Ciba Specialty Chemicals Holding Inc., trade name: IRGANOX-1010)

The methods of evaluation in this Embodiment were as follows.

<Evaluation of Draw Down Property>

The evaluation was made in a similar manner to the evaluation method in the aforementioned first Embodiment.

<Tensile Test (Measurement of Maximum Tensile Stress, Tensile Fracture Stress, Tensile Fracture Strain, and Tensile Modulus of Elasticity)>

A dumbbell for testing was punched out from the obtained sheet, and maximum tensile stress, tensile fracture stress, tensile fracture strain and tensile modulus of elasticity were measured using an autograph (manufactured by Shimadzu Corporation), in accordance with JIS K7161. Each measurement was made with respect to both longitudinal direction (MD) and cross direction (TD) in production of the sheet.

<(Visual) Evaluation of Transparency>

The sheet used in the aforementioned tensile test was visually evaluated.

A: satisfactorily transparent;
B: poorly transparent; and
C: not transparent.

<Evaluation of Dupont Impact Resistance>

To the obtained sheet was dropped down a weight of 500 g using a hemispheric jig of ½ inch from the height of 30 cm. Breakage of the sheet was visually evaluated.

(Evaluation Standards)

AA: entire whitening alone, with no breakage occurred. Further, no breakage occurred even though the weight was dropped down from the height of 40 cm;

A: entire whitening;
B: only partial whitening, with partial breakage; and
C: broken in pieces.

<Measurement of Modulus of Elasticity in Flexure>

The resulting resin composition pellet was subjected to injection molding using a 75-ton injection molding machine manufactured by Toshiba Corporation at an injection temperature of 190° C. to produce a ¼ inch-bar. The modulus of elasticity in flexure of thus resulting ¼ inch-bar was measured using an autograph (manufactured by Shimadzu Corporation), in accordance with JIS K7203.

<Measurement of Heat Resistance>

The resulting resin composition pellet was subjected to injection molding using a 75-ton injection molding machine manufactured by Toshiba Corporation at an injection temperature of 190° C. to produce a ¼ inch-bar. The heat deflection temperature (HDT) of thus resulting ¼ inch-bar under a load of 0.45 MPa was measured in accordance with JIS K7207 (A method).

EXAMPLES 11 TO 17 AND COMPARATIVE EXAMPLES 4 TO 6

PHBH having an HH rate of 12 mol %, and a Mw (weight average molecular weight) of about 500,000 was used which was produced using Alcaligenes eutrophus AC32 (J. Bacteriol., 179, 4821 (1997)), which had been prepared by introducing a PHA synthetic enzyme gene derived from Aeromonas caviae into Alcaligenes eutrophus as a microorganism, through arbitrarily adjusting the raw material and culture conditions. The other materials were compounded as in Table 5 showing the materials and amounts represented by parts, and then used.

A mixture of the poly[(3-hydroxybutyrate)-co-(3-hydroxyhexanoate)] [PHBH], the acrylic core-shell type graft copolymer, the acrylic processing modifier, the nucleating agent and the antioxidant with a compounding proportion shown in Table 5 was subjected to melt kneading using a twin screw extrusion molding machine (manufactured by Japan Steel Works, Ltd., TEX33, ϕ33 mm) at a cylinder preset temperature of 170° C., whereby a composition pellet was obtained. Thus resulting pellet of the composition was extruded using a single screw extruder, LABO PRASTOMILL (manufactured by Toyo Seiki Seisaku-sho, Ltd., type 20C200) equipped with a T die having a width of 150 mm and a lip of 0.25 mm at a processing temperature of 160° C. and a screw speed of 10 rpm, whereby a sheet was obtained. The draw down in extrusion was evaluated according to the method as described above. Using thus obtained sheet, evaluation on tensile properties, impact resistance, modulus of elasticity in flexure, heat resistance, and transparency was made. The results are shown in Table 6.

Mw=8,000,000 (manufactured by KANEKA CORPORATION, refractive index: 1.485)

nucleating agent: behenic acid amide (manufactured by CRODA KK, Incroslip B)

antioxidant: hindered phenolic antioxidant (manufactured by Ciba Specialty Chemicals Holding Inc., IRGANOX-1010)

MMA: methyl methacrylate

BA: butyl acrylate

ST: styrene

AN: acrylonitrile

QHPO: cumene hydroperoxide

TABLE 5

|  |  | | Example | | | | | | | Compar. Ex. | | |
|---|---|---|---|---|---|---|---|---|---|---|---|---|
|  |  | | \multicolumn{10}{c|}{Number of Example and Compar. Ex.} |
|  |  |  | 11 | 12 | 13 | 14 | 15 | 16 | 17 | 4 | 5 | 6 |
| PHBH (HH rate 12 mol %) | | (part) | 100 | 100 | 100 | 100 | 100 | 100 | 100 | 100 | 100 | 100 |
| Acrylic core shell type graft copolymer M-400 | | (part) | 5 | 10 | 10 | 10 | 10 | 30 | 10 |  | 5 |  |
| Acrylic processing modifier | PA-10 | (part) |  |  |  | 3 |  |  |  |  |  |  |
|  | PA-20 | (part) |  |  | 3 |  |  |  |  |  |  |  |
|  | PA-60 | (part) | 1 | 3 |  |  | 3 | 3 | 15 |  |  | 1 |
| Talc (mean particle size 7 μm) | | (part) |  |  |  |  | 10 |  |  |  |  |  |
| Nucleating agent Incroslip B | | (part) | 1 | 2 | 2 | 2 | 2 | 2 | 2 | 3 | 2 | 1 |
| Antioxidant IR-1010 | | (part) | 0.2 | 0.2 | 0.2 | 0.2 | 0.2 | 0.2 | 0.2 | 0.2 | 0.2 | 0.2 |

TABLE 6

|  |  |  | Example | | | | | | | Compar. Ex. | | |
|---|---|---|---|---|---|---|---|---|---|---|---|---|
|  |  |  | \multicolumn{10}{c|}{Number of Example and Compar. Ex.} |
|  |  |  | 11 | 12 | 13 | 14 | 15 | 16 | 17 | 4 | 5 | 6 |
| Draw down characteristic | | (sec) | 42 | 70 | 65 | 60 | 75 | 75 | 80 | 26 | 30 | 37 |
| Maximum tensile stress | MD | (MPa) | 25 | 20 | 19 | 19 | 25 | 15 | 25 | 19 | 18 | 26 |
|  | TD | (MPa) | 23 | 18 | 17 | 17 | 24 | 13 | 24 | 17 | 16 | 25 |
| Tensile fracture stress | MD | (MPa) | 25 | 19 | 18 | 18 | 24 | 14 | 24 | 14 | 13 | 24 |
|  | TD | (MPa) | 22 | 17 | 16 | 16 | 22 | 12 | 22 | 11 | 10 | 21 |
| Tensile fracture strain | MD | (%) | 330 | 400 | 390 | 380 | 230 | 500 | 380 | 22 | 300 | 290 |
|  | TD | (%) | 270 | 350 | 340 | 330 | 220 | 450 | 320 | 15 | 260 | 190 |
| Tensile modulus of elasticity | MD | (MPa) | 500 | 450 | 430 | 420 | 600 | 350 | 450 | 1200 | 750 | 770 |
|  | TD | (MPa) | 460 | 430 | 410 | 400 | 570 | 320 | 430 | 1100 | 730 | 830 |
| Dupont impact resistance | | | B | B to A | B to A | B to A | B to A | AA | B to A | C | B | C |
| Modulus of elasticity in flexure | | (MPa) | 760 | 700 | 690 | 690 | 950 | 480 | 750 | 860 | 760 | 770 |
| Heat resistance | | (° C.) | 95 | 93 | 92 | 92 | 97 | 85 | 95 | 97 | 95 | 97 |
| Transparency | | | A | A | A | A | C | A | A | B | A | B |

From the results shown in Table 6, it was revealed that in the system comprising the core-shell type graft copolymer having the acrylic rubber as a core layer and the polymer prepared from the vinyl monomer as a shell layer, and the acrylic processing modifier mixed therewith, the resin compositions that were excellent in transparency were obtained, with improved processability such as draw down property and the like, and tensile property.

Third Embodiment

The resins and additives used in present invention are as follows.
PHBH: poly[(3-hydroxybutyrate)-co-(3-hydroxyhexanoate)] (HH rate: molar fraction (mol %) of 3-hydroxyhexanoate in PHBH being 12%) (refractive index: 1.485)
diene rubber graft copolymer: one obtained in Production Example 6 below acrylic processing modifier: PA-60, <Tensile Test (Measurement of Maximum Tensile Stress, Tensile Fracture Stress, Tensile Fracture Strain, and Tensile Modulus of Elasticity)>

According to the method described above, the value with respect to the length direction (MD) in production of the sheet was measured.

<Evaluation of Dupont Impact Resistance>

To the obtained sheet was dropped down a weight of 500 g using a hemispheric jig of ½ inch from the height of 30 cm. Breakage of the sheet was visually evaluated.

(Evaluation Standards)

AA: entire whitening alone, with no breakage occurred. Further, no breakage occurred even though the weight was dropped down from the height of 40 cm;

A: entire whitening;

B: only partial whitening, with partial breakage; and

C: broken in pieces.

<Measurement of Modulus of Elasticity in Flexure>

The resulting resin composition pellet was subjected to injection molding using a 75-ton injection molding machine manufactured by Toshiba Corporation at an injection temperature of 190° C. to produce a ¼ inch-bar. The modulus of elasticity in flexure of thus resulting ¼ inch-bar was measured using an autograph (manufactured by Shimadzu Corporation), in accordance with JIS K7203.

<Measurement of Heat Resistance>

The resulting resin composition pellet was subjected to injection molding using a 75-ton injection molding machine manufactured by Toshiba Corporation at an injection temperature of 190° C. to produce a ¼ inch-bar. The heat deflection temperature (HDT) of thus resulting ¼ inch-bar under a load of 0.45 MPa was measured in accordance with JIS K7207 (A method).

PRODUCTION EXAMPLE 6

Production of Diene Rubber Graft Copolymer
[Preparation of (R-1) Rubber Latex]

Into a 100-L polymerization unit were charged 90 parts of pure water, 0.3 parts of potassium persulfate, 1.0 part of potassium phosphate, 0.1 parts of potassium hydroxide and 0.2 parts of t-dodecyl mercaptan. Next, the air in the polymerization unit was removed with a vacuum pump, and thereafter, 2.0 parts of potassium rosinate and 100 parts of butadiene were charged. The temperature of the system was elevated to 50° C. to initiate the polymerization. Further, as the polymerization proceeds, the temperature in the system was elevated at a rate of 2.5° C./hour, and thereafter kept at 75° C. Thus, the inversion rate of 92% was achieved with the reaction time of 50 hrs. After completing the reaction, the unreacted butadiene was eliminated by steam distillation to obtain a polybutadiene latex (R-1).

The gel content and the mean particle size of the latex (R-1) were 75% and 0.23 μm (according to observation on a transmission electron micrograph).

[Production of Graft Copolymers D-1 to D-3]

Using the diene rubber latex R-1 having the composition shown in Table 7, graft polymerization onto the diene rubber was carried out by adding water to give the latex content of 220 parts while agitation in a nitrogen stream and keeping at 60° C., followed by adding 1.3 parts of sodium sulfate, adding 0.2 parts of SFS, and adding the mixture of the vinyl monomer shown in Table 7 dropwisely continuously over a time period shown in Table 7 and then keeping at 60° C. for 1.5 hrs to complete the polymerization.

To thus resulting diene rubber graft copolymer latex were added 0.3 parts of the antioxidant and 1.5 parts of calcium chloride, and the yielded coagulated matter was separated and washed, which was then dried to obtain a powdery diene rubber graft copolymer.

TABLE 7

| Diene rubber | Rubber component | | Vinyl monomer | | | | | Monomer |
| --- | --- | --- | --- | --- | --- | --- | --- | --- |
| graft copolymer | Rubber type | (part) | MMA (part) | BA (part) | ST (part) | AN (part) | QHPO (part) | addition time (Hr) |
| D-1 | R-1 | 75 | 20 | 5 | | | 0.15 | 2.5 |
| D-2 | R-1 | 75 | 15 | | 10 | | 0.15 | 2.5 |
| D-3 | R-1 | 75 | 10 | | 10 | 5 | 0.15 | 2.5 |

Note 1) Before adding the vinyl monomer, 1.3 parts of sodium sulfate was added.

EXAMPLES 18 TO 27 AND COMPARATIVE EXAMPLES 7 TO 9

PHBH having an HH rate of 12 mol %, and a Mw (weight average molecular weight) of about 500,000 was used which was produced using Alcaligenes eutrophus AC32 (J. Bacteriol., 179, 4821 (1997)), which had been prepared by introducing a PHA synthetic enzyme gene derived from Aeromonas caviae into Alcaligenes eutrophus as a microorganism, through appropriately adjusting the raw material and culture conditions. The other materials were compounded as in Table 8 showing the materials and amounts represented by parts, and then used.

A mixture of the poly[(3-hydroxybutyrate)-co-(3-hydroxyhexanoate)] [PHBH], the diene rubber graft copolymer, the acrylic processing modifier, the nucleating agent and the antioxidant with a compounding proportion shown in Table 8 was subjected to melt kneading using a twin screw extrusion molding machine (manufactured by Japan Steel Works, Ltd., TEX33, φ33 mm) at a cylinder preset temperature of 170° C., whereby a composition pellet was obtained.

This pellet of the composition was extruded using a single screw extruder, LABO PRASTOMILL (manufactured by Toyo Seiki Seisaku-sho, Ltd., type 20C200) equipped with a T die having a width of 150 mm and a lip of 0.25 mm under a condition at a processing temperature of 160° C. and a screw speed of 10 rpm, whereby a sheet was obtained. The draw down in extrusion was evaluated according to the method as described above.

Using thus obtained sheet, evaluation on tensile properties, impact resistance, modulus of elasticity in flexure, and heat resistance was made. The results are shown in Table 9.

TABLE 8

| | \multicolumn{8}{c}{Resin composition} | | | | | | | |
|---|---|---|---|---|---|---|---|---|
| | PHBH HH rate 7 mol % | PHBH HH rate 12 mol % | Diene rubber graft copolymer (B3) | | Acrylic processing modifier (C) | | Talc (mean particle size 7 μm) | Behenic acid amide Incroslip B | Antioxidant IR-1010 |
| | (part) | (part) | type | (part) | type | (part) | (part) | (part) | (part) |
| Example-18 | 100 | | D-1 | 10 | P-3 | 3 | | 2 | 0.2 |
| Example-19 | | 100 | D-1 | 10 | P-3 | 3 | | 2 | 0.2 |
| Example-20 | | 100 | D-1 | 10 | P-3 | 3 | 10 | 2 | 0.2 |
| Example-21 | | 100 | D-2 | 10 | P-3 | 3 | | 2 | 0.2 |
| Example-22 | | 100 | D-3 | 10 | P-3 | 3 | | 2 | 0.2 |
| Example-23 | | 100 | D-1 | 10 | P-2 | 3 | | 2 | 0.2 |
| Example-24 | | 100 | D-1 | 10 | P-1 | 3 | | 2 | 0.2 |
| Example-25 | | 100 | D-1 | 10 | PA60 | 3 | | 2 | 0.2 |
| Example-26 | | 100 | D-1 | 30 | P-3 | 3 | | 2 | 0.2 |
| Example-27 | | 100 | D-1 | 10 | P-3 | 15 | | 2 | 0.2 |
| Compar. Ex.-7 | | 100 | | 0 | P-3 | 3 | | 2 | 0.2 |
| Compar. Ex.-8 | | 100 | D-1 | 10 | | 0 | | 2 | 0.2 |
| Compar. Ex.-9 | | 100 | | 0 | | 0 | | 2 | 0.2 |

TABLE 9

| | \multicolumn{6}{c}{Evaluation results} | | | | | |
|---|---|---|---|---|---|---|
| | Draw down characteristic (sec) | Tensile fracture strain <MD> (%) | Tensile fracture stress <MD> (MPa) | Dupont impact resistance Visual evaluation | Modulus of elasticity in flexure (MPa) | Heat resistance (° C.) |
| Example-18 | 79 | 285 | 22 | B | 1010 | 110 |
| Example-19 | 80 | 335 | 24 | A | 685 | 92 |
| Example-20 | 83 | 45 | 24 | B | 906 | 98 |
| Example-21 | 78 | 305 | 23 | A | 681 | 93 |
| Example-22 | 77 | 260 | 20 | A | 686 | 93 |
| Example-23 | 75 | 290 | 22 | A | 681 | 91 |
| Example-24 | 68 | 250 | 20 | A | 672 | 91 |
| Example-25 | 84 | 365 | 23 | A | 693 | 93 |
| Example-26 | 91 | 464 | 14 | AA | 472 | 85 |
| Example-27 | 96 | 395 | 24 | B to A | 725 | 95 |
| Compar. Ex.-7 | 74 | 300 | 24 | C | 865 | 98 |
| Compar. Ex.-8 | 44 | 250 | 23 | A | 755 | 88 |
| Compar. Ex.-9 | 30 | 21 | 20 | C | 850 | 96 |

From the results shown in Table 9, it was revealed that in the system comprising the graft copolymer obtained by graft polymerization of the vinyl monomer onto the diene rubber, and the acrylic processing modifier mixed therewith, the resin compositions with improved processability such as draw down property and the like, and tensile properties could be obtained.

INDUSTRIAL APPLICABILITY

The resin composition of the present invention is formed into a variety of molded articles such as fiber, string, rope, woven fabric, knit fabric, nonwoven fabric, paper, film, sheet, tube, plate, bar, vessel, bag, accessory, foam and the like, which may be used alone. Alternatively, it can be used by combining with a variety of fiber, string, rope, woven fabric, knit fabric, nonwoven fabric, paper, film, sheet, tube, plate, bar, vessel, bag, accessory, foam or the like constituted with a simple substance other than this composition to improve the physical property of the simple substance. The molded article obtained in this manner can be suitably used in fields such as agriculture, fishery, forestry, horticulture, medicine, sanitary goods, food industry, clothing, nonclothing, packaging, automobile, building material, and others.

The invention claimed is:

1. A resin composition comprising
(A) a biodegradable (3-hydroxyalkanoate) copolymer,
(B) a graft copolymer, and
(C) an acrylic processing modifier,
wherein the biodegradable (3-hydroxyalkanoate) copolymer (A) has a recurring unit represented by the formula (1): [—CHR—CH$_2$—CO—O—] (wherein R represents an alkyl group represented by C$_n$H$_{2n+1}$; and n is an integer of 1 to 15) and
wherein the biodegradable (3-hydroxyalkanoate) copolymer (A) is poly[(3-hydroxybutyrate)-co-(3-hydroxyhexanoate)] having a (3-hydroxybutyrate) recurring unit and a (3-hydroxyhexanoate) recurring unit and the constituent ratio of the recurring units in the poly[(3-hydroxybutyrate)-co-(3-hydroxyhexanoate)] is represented by (3-hydroxybutyrate) unit/(3-hydroxyhexanoate) unit=99/1 to 80/20 (mol/mol);
the graft copolymer (B) is obtained by graft polymerization of a vinyl monomer onto at least one rubber selected from the group consisting of (b1) a composite rubber comprising a polyorganosiloxane component and a polyalkyl (meth)acrylate component, (b2) an acrylic rubber, and (b3) a diene rubber constituted with a diene monomer and the vinyl monomer in the graft copolymer (B) comprises 70 to 100% by weight of at least one vinyl monomer selected from the group consisting of a vinyl cyanide monomer, an aromatic vinyl monomer, an acrylic ester and methacrylic ester, and 30 to 0% by weight of other vinyl monomer that is copolymerizable therewith;

the acrylic processing modifier (C) has a weight average molecular weight (Mw) of 500,000 to 10,000,000;

the resin composition comprises 0.5 to 30 parts by weight of the graft copolymer (B), and 0.1 to 20 parts by weight of the acrylic processing modifier (C) based on 100 parts by weight of the biodegradable (3-hydroxyalkanoate) copolymer (A);

the biodegradable (3-hydroxyalkanoate) copolymer (A) has a molecular weight of 300,000 to 3,000,000 in terms of the weight average molecular weight;

the acrylic processing modifier (C) predominately comprises a copolymer of butyl acrylate and methyl methacrylate, or a copolymer of butyl methacrylate and methyl methacrylate; and wherein the composition contains an antioxidant and a fatty acid amide having 10 to 50 carbon atoms as a nucleating agent.

2. The resin composition according to claim 1 wherein the graft copolymer (B) is obtained by graft polymerization of the vinyl monomer onto the acrylic rubber (b2), and the difference in refractive indices between the graft copolymer (B) and the poly(3-hydroxyalkanoate) (A), and the difference in refractive indices between the acrylic processing modifier (C) and the poly(3-hydroxyalkanoate) (A) are equal to or less than 0.02, respectively.

3. The resin composition according to claim 1 wherein a monomer that constitutes the acrylic rubber (b2) predominantly comprises an acrylic ester, and the vinyl monomer predominantly comprises a methacrylic alkyl ester.

4. The resin composition according to claim 1 wherein the diene rubber (b3) is obtained by copolymerization of 50 to 100% by weight of the diene monomer, 50 to 0% by weight of other vinyl monomer that is copolymerizable with the diene monomer, and 0 to 5% by weight of a polyfunctional monomer having two or more nonconjugated double bonds within one molecule (wherein total of the diene monomer, the vinyl monomer and the polyfunctional monomer accounting for 100% by weight), and the weight ratio of the diene rubber (b3) and the vinyl monomer subjected to the graft polymerization is diene rubber (b3)/vinyl monomer=15/85 to 90/10 (wt/wt).

5. The resin composition according to claim 1 further comprising 0.1 to 10 parts by weight of at least one selected from an urea derivative and a sorbitol compound as a nucleating agent based on 100 parts by weight of total amount of the (A), (B) and (C).

6. The resin composition according to claim 1 further comprising 0.1 to 100 parts by weight of a filler based on 100 parts by weight of total amount of the (A), (B) and (C).

7. The resin composition according to claim 1 wherein the antioxidant is a hindered phenolic antioxidant.

* * * * *